United States Patent
Subramanian

(10) Patent No.: US 11,159,445 B1
(45) Date of Patent: Oct. 26, 2021

(54) SYSTEMS AND METHODS FOR EXTENDING INTERNAL ENDPOINTS OF A NETWORK DEVICE

(71) Applicant: Xilinx, Inc., San Jose, CA (US)

(72) Inventor: Ramesh R. Subramanian, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/697,155

(22) Filed: Nov. 26, 2019

(51) Int. Cl.
| | |
|---|---|
| *H04L 29/06* | (2006.01) |
| *H04L 12/865* | (2013.01) |
| *H04L 12/743* | (2013.01) |
| *H04L 12/879* | (2013.01) |
| *H04L 12/875* | (2013.01) |
| *H04L 12/853* | (2013.01) |

(52) U.S. Cl.
CPC ...... *H04L 47/6275* (2013.01); *H04L 45/7457* (2013.01); *H04L 47/2416* (2013.01); *H04L 47/56* (2013.01); *H04L 49/901* (2013.01)

(58) Field of Classification Search
CPC .............. H04L 63/202; H04L 63/1441; H04L 63/0236; H04L 63/20; H04L 63/0263; H04L 63/1425; H04L 63/1433; H04L 29/06; H04L 47/125; H04L 49/552; H04L 45/7457; H04L 47/6255; H04L 49/351; H04L 63/101; H04L 63/0227; G06F 21/55; G06F 15/7867; G06F 15/17331; G06K 9/00885
USPC ......................................................... 370/392
See application file for complete search history.

(56) References Cited

U.S. PATENT DOCUMENTS

| | | | |
|---|---|---|---|
| 9,256,560 B2 * | 2/2016 | Pope ................... | G06F 13/4295 |
| 9,800,698 B1 * | 10/2017 | Reinbold .............. | H04L 69/321 |
| 9,916,129 B1 | 3/2018 | Ahmad et al. | |
| 10,284,473 B1 * | 5/2019 | Sharma ............... | H04L 63/0227 |
| 10,432,536 B1 | 10/2019 | Subramanian et al. | |
| 10,541,934 B1 * | 1/2020 | Subramanian ...... | H04L 47/6255 |
| 10,686,838 B2 * | 6/2020 | Park ...................... | H04L 63/101 |
| 10,848,331 B2 * | 11/2020 | Roy ........................ | H04L 69/16 |
| 10,853,308 B1 * | 12/2020 | Subramanian .... | G06F 15/17331 |
| 10,862,802 B1 * | 12/2020 | Subramanian ...... | H04L 12/4633 |
| 2008/0229415 A1 * | 9/2008 | Kapoor ................... | H04L 63/14 726/22 |
| 2013/0114593 A1 * | 5/2013 | Jabr ....................... | H04L 49/552 370/389 |

(Continued)

OTHER PUBLICATIONS

MEF Technical Specification MEF 10.3, Ethernet Services Attributes Phase 3, Oct. 2013, © The MEF Forum 2013, 120 pgs.

(Continued)

*Primary Examiner* — Man U Phan
(74) *Attorney, Agent, or Firm* — Haynes and Boone, LLP

(57) ABSTRACT

An integrated circuit (IC) device includes a network device. The network device includes first and second network ports each configured to connect to a network, and an internal endpoint port configured to connect to first endpoint having a first processing unit and second endpoint having a second processing unit. A lookup circuit is configured to provide a first forwarding decision for a first frame to be forwarded to the first endpoint. An endpoint extension circuit is configured to determine a first memory channel based on the first forwarding decision for forwarding the first frame, and forward the first frame to the first endpoint using the determined memory channel.

20 Claims, 15 Drawing Sheets

(56) References Cited

U.S. PATENT DOCUMENTS

2020/0195469 A1\* 6/2020 Mclean .................. G06F 13/404
2020/0226078 A1\* 7/2020 Tanaka .................... G06F 13/28
2020/0351752 A1\* 11/2020 Sivasiva Ganesan .. H04L 41/12

OTHER PUBLICATIONS

Markus Jochim, General Motors Research & Development, "Ingress Policing", IEEE 802.1 TSN Plenary, Nov. 10-15, 2013—Dallas—USA, 43 pages.
Stephen Haddock, "Frame Metering in 802.1Q", Version 1, Jan. 15, 2013, 20 pages, http://www.ieee802.org/1/files/public/docs2013/new-tsn-haddock-flow-metering-in-Q-0113-v01.pdf.
U.S. Appl. No. 16/195,218, filed Nov. 19, 2018, San Jose, CA USA.
U.S. Appl. No. 15/837,400, filed Dec. 11, 2017, San Jose CA USA.
U.S. Appl. No. 15/948,881, filed Apr. 9, 2018, San Jose CA USA.
U.S. Appl. No. 116697144 filed Nov. 26, 2019, San Jose CA USA.

\* cited by examiner

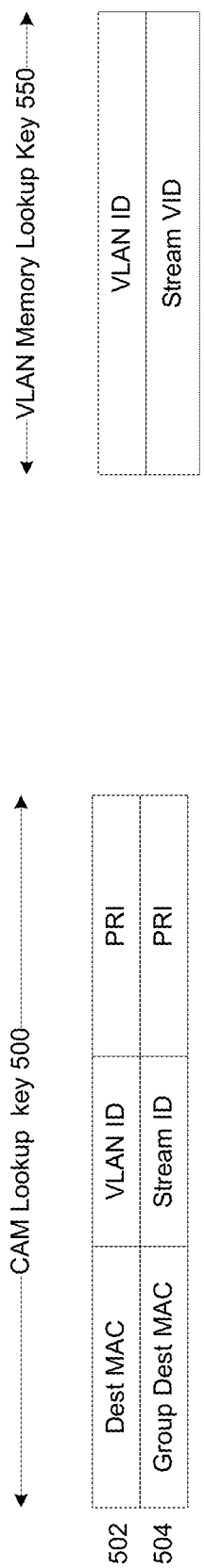
FIG. 5A
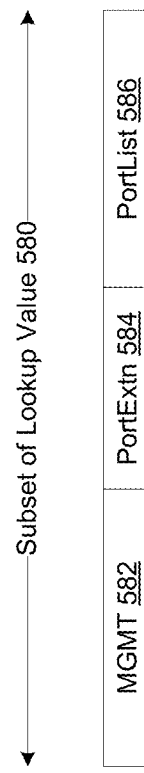
FIG. 5B
FIG. 5C

| DMA Channel | Connectivity | Linux Ethernet Interface | Function |
|---|---|---|---|
| Channel-0 | Endpoint Scheduled Queue | Eth-4 [Endpoint Ethernet Interface] | Data for Highest Priority Scheduled queue |
| Channel-1 | Endpoint Reserved Queue | Eth-4 [Endpoint Ethernet Interface] | Data for Second highest priority Reserved queue |
| Channel-2 | Endpoint Best Effort Queue | Eth-4 [Endpoint Ethernet Interface] | Data for Best effort queue. Can also have layer 2 and above control frames for protocols such as LLDP, ARP, SNMP. |
| Channel-3 | Extended Endpoint Scheduled Queue | Eth-5 [Extended Endpoint Ethernet Interface] | Data for Highest Priority Scheduled queue |
| Channel-4 | Extended Endpoint Reserved Queue | Eth-5 [Extended Endpoint Ethernet Interface] | Data for Second highest priority Reserved queue |
| Channel-5 | Extended Endpoint Best Effort Queue | Eth-5 [Extended Endpoint Ethernet Interface] | Data for Best effort queue. Can also have layer 2 and above control frames for protocols such as LLDP, ARP, SNMP. |
| Channel-6 | Bridge Management | Eth-0 to Eth-3 [Bridge Management Layer] | Point to Point Layer 2 control frame [STP, LLDP, PTP] from Network Ports and Internal Endpoints |

FIG. 13

SYSTEMS AND METHODS FOR EXTENDING INTERNAL ENDPOINTS OF A NETWORK DEVICE

FIELD

Examples of the present disclosure generally relate to integrated circuits (ICs) and, in particular, to an embodiment related to system and methods for extending internal end stations of network devices using an IC in a network.

BACKGROUND

In a communication system, a switching device may receive streams including frames (packets) containing data or control information on one port, and based on destination information contained within the frames, routes the frames out another port to the destination (or an intermediary destination). Many applications using the communication system, such as process control applications and machine control applications may have a large number of streams. Moreover, these applications may be latency critical to meeting control loop frequency requirements.

Accordingly, it would be desirable and useful to provide an improved way for a time sensitive network solution.

SUMMARY

In some embodiments in accordance with the present disclosure, an integrated circuit (IC) device includes a network device. The network device includes first and second network ports each configured to connect to a network, and an internal endpoint port configured to connect to first endpoint having a first processing unit and second endpoint having a second processing unit; a lookup circuit configured to provide a first forwarding decision for a first frame to be forwarded to the first endpoint; and an endpoint extension circuit configured to determine a memory channel based on the first forwarding decision for forwarding the first frame and forward the first frame to the first endpoint using the determined memory channel.

In some embodiments, the determined memory channel is a direct memory access (DMA) channel provided by a multi-channel DMA controller.

In some embodiments, the lookup circuit includes: a content addressable memory (CAM); and a CAM lookup unit coupled to the CAM and configured to: generate a lookup key based on a received frame; and provide a lookup value using the CAM based on the lookup key, wherein the lookup value includes the first endpoint information.

In some embodiments, the first processing unit includes a cluster with a plurality of sub-processors, and wherein the second processing unit includes a single processor.

In some embodiments, the first processing unit includes a first processor of a cluster, and the second processing unit includes a second processor of the cluster.

In some embodiments, the IC device includes a third processing unit including a bridge management layer, wherein the third processing unit is configured to communicate with the network device using the internal endpoint port.

In some embodiments, the IC device includes a memory channel configuration unit configured to: provide a first memory channel for communicating data frames for a highest priority schedule queue for a first ethernet interface of the first endpoint; and provide a second memory channel for communicating data frames for a highest priority schedule queue for a second ethernet interface of the second endpoint.

In some embodiments, the memory channel configuration unit is configured to: provide a third memory channel for communicating data frames for a best effort queue for the first ethernet interface of the first endpoint, wherein the third memory channel is also used for communicating layer-2 and above control frames.

In some embodiments, the memory channel configuration unit is configured to: provide a bridge management memory channel for communicating point-to-point layer-2 control frames between one of the first and second network ports and one of the first and second endpoints.

In some embodiments, the bridge management layer is configured to provide a link layer discovery protocol (LLDP) management information base (MIB).

In some embodiments, a method includes providing a network device including a first network port connected to a network, a second network port connected to the network, and an internal endpoint port connected to a first endpoint including a first processing unit and a second endpoint including a second processing unit; receiving a first frame from one of the first network port, second network port, and internal endpoint port; performing a lookup process to determine a first forwarding decision for forwarding a first frame to the first endpoint; determining a memory channel based on the first forwarding decision for forwarding the first frame to the first endpoint; and forwarding the first frame to the first endpoint using the determined memory channel.

In some embodiments, the lookup process includes: generating a lookup key based on the first frame; and providing a lookup value using a content addressable memory (CAM) of the network device based on the lookup key, wherein the lookup value includes the first endpoint information.

In some embodiments, the method includes communicating, by a bridge management layer, bridge management information with the network device using the internal endpoint port.

In some embodiments, the method includes providing a first memory channel for communicating data frames for a highest priority schedule queue for a first ethernet interface of the first endpoint; and providing a second memory channel for communicating data frames for a highest priority schedule queue for a second ethernet interface of the second endpoint.

In some embodiments, the method includes providing a third memory channel for communicating data frames for a best effort queue for the first ethernet interface of the first endpoint, wherein the third memory channel is also used for communicating layer-2 and above control frames.

In some embodiments, the method includes providing a bridge management memory channel for communicating point-to-point layer-2 control frames between one of the first and second network ports and one of the first and second endpoints.

In some embodiments, the method includes providing, by the bridge management layer is configured to provide a link layer discovery protocol (LLDP) management information base (MIB).

Other aspects and features will be evident from reading the following detailed description and accompanying drawings.

BRIEF DESCRIPTION OF THE DRAWINGS

FIG. 5A illustrates a lookup key structure of a content addressable memory (CAM) structure according to some embodiments of the present disclosure; FIG. 5B illustrates a lookup key structure of a VLAN membership memory according to some embodiments of the present disclosure; and FIG. 5C illustrates a lookup value structure according to some embodiments of the present disclosure.

FIG. 13 is a table illustrating a multi-channel direct memory access (DMA) configuration according to some embodiments of the present disclosure.

DETAILED DESCRIPTION

Figure 1:
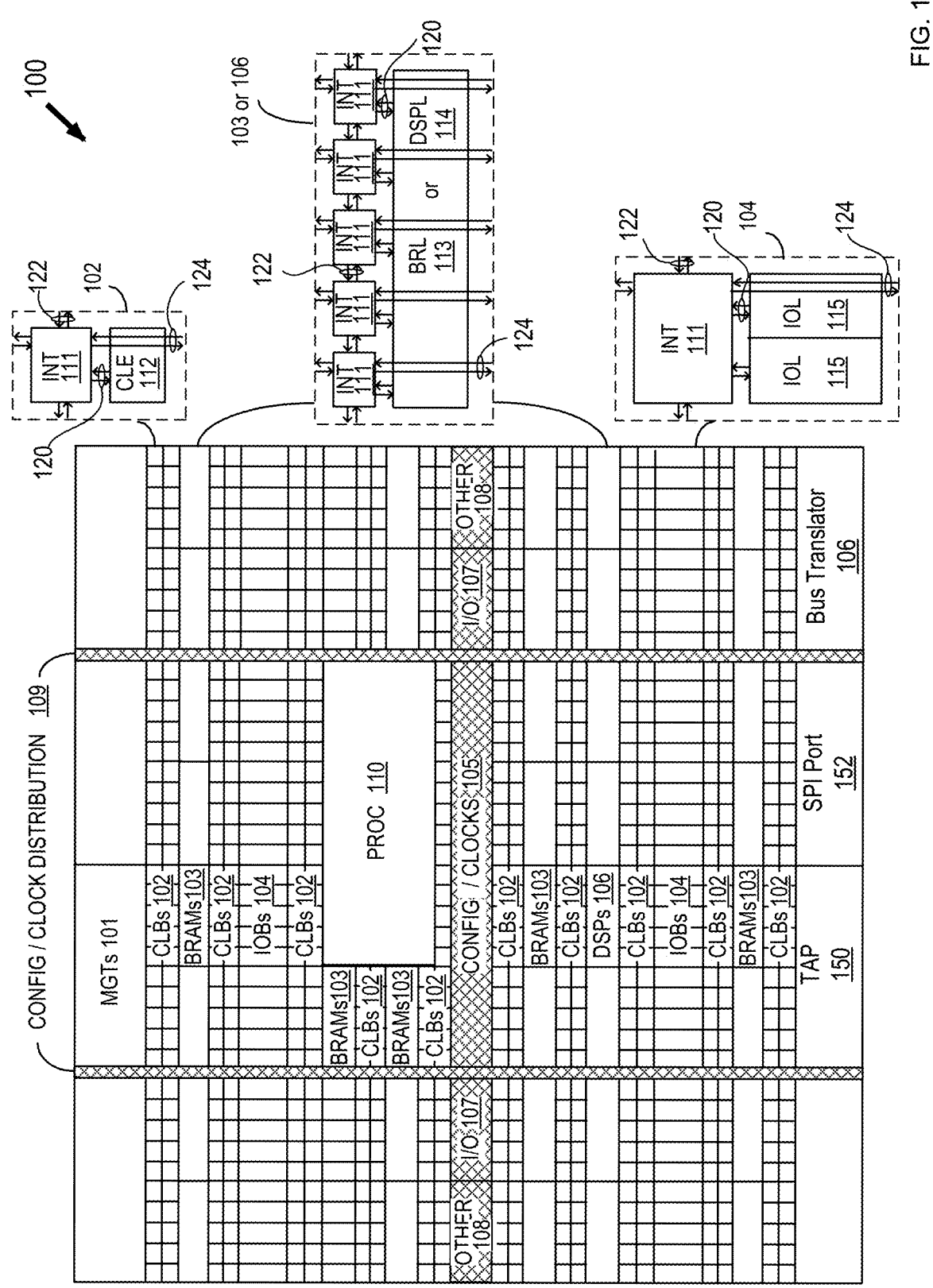
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. Time-sensitive Ethernet frames (e.g., defined by IEEE standards) are typically pre-negotiated for identification mechanism, network paths, bandwidth, fault tolerance and recovery mechanisms. These frames are periodically sent over network, and are also referred as streams. For real time communication of time sensitive streams (e.g., in industrial control applications, digital video and audio data) over the networks, network devices (e.g., switches, bridges, etc.) implement low latency, non-blocking, and highly deterministic frame forwarding mechanisms. To enable deterministic real-time communication over Ethernet, Time-Sensitive Networking (TSN) standards have been defined by the IEEE TSN task group. The TSN standards define network components (e.g., switches, bridges) and endpoint components (e.g., talkers, listeners, etc.) to be part of a time aware system. Such a time aware system may also be referred to as a TSN system. A typical TSN system may include switches and endpoints as separate components. In such a typical TSN system, supporting multiple independent end stations may require a network equipment (e.g., a switch, a bridge) to support multiple ports to connect to these end stations. The separate end stations and network equipments may require point to point (PTP) communications for timing synchronizations. For example, in a four-port TSN bridge, each egress port needs to multiplex traffic from three ingress ports and their associated priority queues. On the other hand, in a three-port TSN bridge, each egress port needs to multiplex traffic from only two ingress ports and their associated priority queues. As such, the cost of implementing a four-port TSN bridge is significantly higher than that of a three-port TSN bridge.

For integrated circuit (IC) solutions, it has been discovered that an IC that integrates network components (e.g., a switch, a bridge) and more than a single endpoint component (e.g., a talker, a listener) may be used in a time aware network system (e.g., a TSN system). An endpoint component is also referred to as an end station. By using endpoint extension techniques, a cost-effective mechanism is provided to enable a single internal endpoint port in a network device to support multiple internal endpoints in the IC. In some embodiments, a network device (e.g., a three-port network device including a single internal endpoint port and two network ports) includes a single internal endpoint port, which supports one or more internal endpoints. In some embodiments, a network device includes multiple internal endpoint ports, where each internal endpoint port is configured to support one or more internal endpoints. In various embodiments, each of the multiple internal endpoint ports may be configured to support the same number of internal endpoints (e.g., 1, 2, 3, . . . , etc.) or different numbers of internal endpoints, which improves design flexibility. Accordingly, integrating a plurality of endpoints with a network device in the same IC using one or more internal endpoint ports of the network device is achieved, where the number of internal endpoint ports is less than the number of the supported internal endpoints. As such, the number of PTP communications is significantly reduced without significantly increased use of resources (e.g., logic elements for increased number of internal endpoint ports).

It is noted that different endpoints may have different bandwidth requirements. For example, a TSN endpoint transmitting sensor data may have a lower bandwidth requirement than another endpoint transmitting digital video and audio data. As such, by connecting endpoints with different bandwidth requirements to the same network device (e.g., a network switch, a network bridge), the overall size of the network is reduced without affecting the performance of the TSN system, which provides an improved TSN solution.

Various advantages may be present in various applications of the present disclosure. No particular advantage is required for all embodiments, and different embodiments may offer different advantages. One of the advantages of some embodiments is that by providing an integrated solution of a switch and multiple endpoints, lower latency is achieved by eliminating latency of a network node to the internal endpoints. Another advantage of some embodiments is that by providing an integrated lookup and forwarding action determination engine, switching component (e.g., TSN switching) and endpoint component (e.g., talker, listener) requirements are integrated, which provides better flexibility without compromising on any of system level flexibilities. For example, the frame lookup and forwarding action determination may be performed using a multi-priority level lookup system including content addressable memory (CAM) lookup, an address comparison lookup, and VLAN membership lookup, which may provide different sets of actions for a frame based on that frame's forwarding path. Such an integrated lookup and forwarding engine may provide the needed hardware accelerations, and also allow the system to have the flexibility to manage (e.g., using software) the IC as a switch and also as one or more of the endpoints. Yet another advantage of some embodiments is that such an integrated lookup and forwarding action determination system may satisfy different lookup and forwarding requirements for traffic having different priorities (e.g., best effort, reserved, scheduled).

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the one or more embodiments described herein is not limited to the exemplary IC depicted in FIG. 1, and that IC having other configurations, or other types of IC, may also implement those embodiments.

Figure 2:
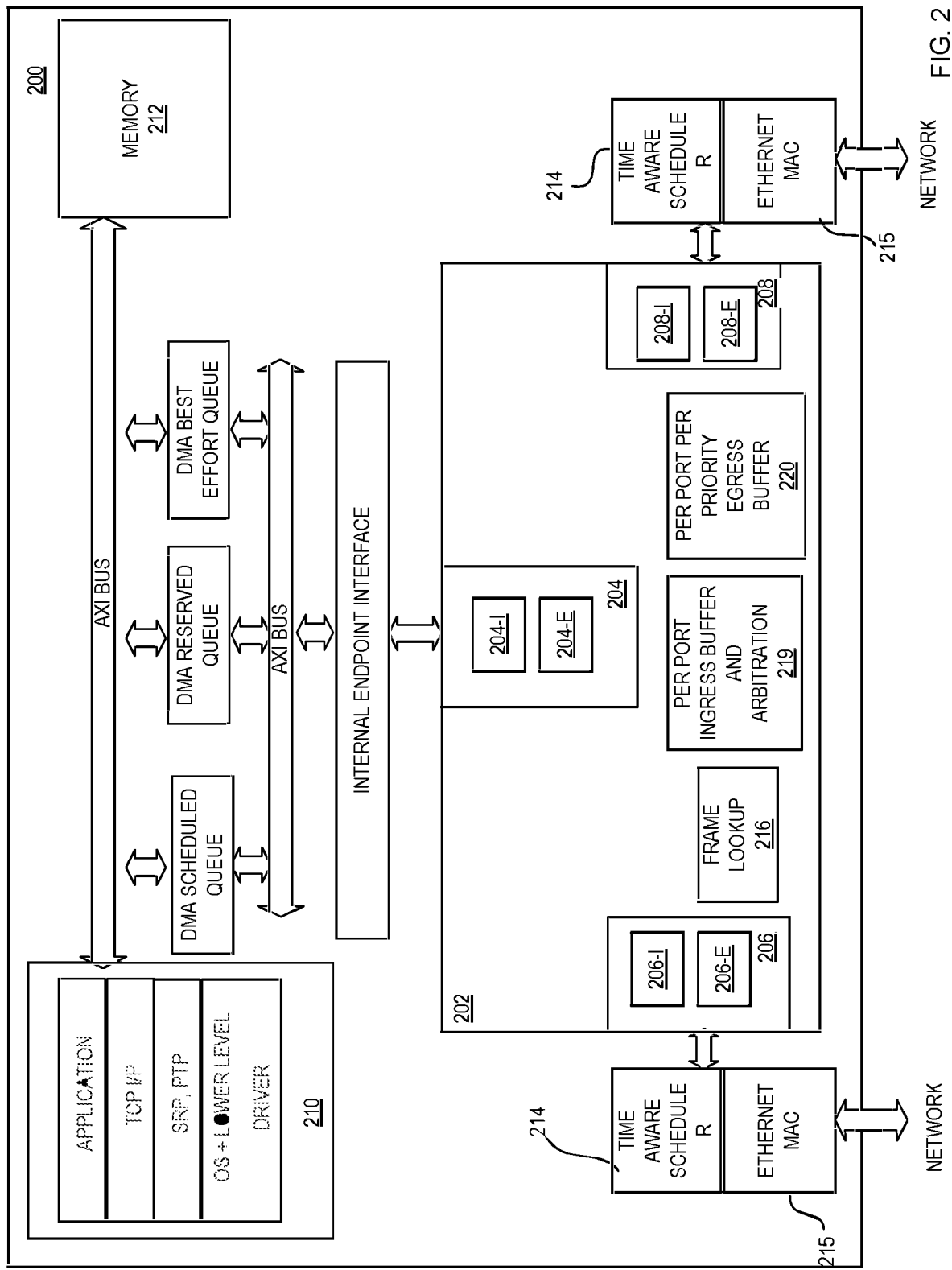
FIG. 2 is a block diagram illustrating an exemplary switch according to some embodiments of the present disclosure.

Referring to FIG. 2, illustrated is an IC 200 including a switch 202 that supports a single internal endpoint (e.g., processing unit 210) is illustrated. The switch 202 includes three ports 204, 206, and 208. The port 204 connects to a processing unit 210 and a memory 212 through internal buses. As such, the port 204 is also referred to as an internal endpoint port 204 or endpoint port 204. The ports 206 and 208 are connected to an external network through a network interface (e.g., an Ethernet media access control (MAC) interface 215). As such, ports 206 and 208 are also referred to as network ports 206 and 208. Each of the ports 204, 206, and 208 includes an ingress port (e.g., ingress ports 204-I, 206-I, 208-I) and an egress port (e.g., 204-E, 206-E, and 208-E).

In some embodiments, the switch 202 supports queues having different priorities (e.g., a scheduled priority, a reserved priority, a best effort priority). For example, a scheduled queue (e.g., including control data) may have a scheduled priority, which indicates that the frames in the scheduled queue are time critical, and have a priority higher than other priorities. For further example, a reserved queue (e.g., including audio/video data) may have a reserved priority, indicating that the frames in the reserved queue have a lower priority than the scheduled priority. For further example, a best effort queue may have a best effort priority, which indicates that the frames in that best effort queue are not time critical, and have a lower priority than the reserved priority.

In the example of FIG. 2, the switch 202 includes a frame lookup unit 216, a member decision unit 217, an arbitration unit 219, and an egress per priority buffering unit 220. The frame lookup unit 216 may look up values (e.g., translations, actions) associated with a particular frame. The member decision unit 217 may determine member decisions including actions associated with a sequence including multiple member streams for sequence recovery. In some embodiments, the switch 202 also includes a traffic policer including a filtering unit, a metering unit, and a policing unit. The filtering unit may perform filtering using various filtering rules on a per stream basis, and output a filtering decision (e.g., allowing, dropping, or blocking). The filtering unit may then send streams that comply with its filtering rules to the metering unit. The metering unit may perform a metering function based on bandwidth profiles, and provide metering decisions (e.g., marking including red, yellow, green) for each frame. The policing unit may then police the network traffic by performing various actions (e.g., allowing, dropping, marking) to the frames based on the filtering decisions and metering decisions. The arbitration unit 219 may perform a per stream frame replication and elimination function to avoid frame loss due to equipment failure. The arbitration unit 219 arbitrates across all ingress ports based on the frame lookup values from the frame lookup unit 216, filtering decisions, member decisions, and/or a combination thereof, and may also be referred to as a traffic control circuit 219. The egress per priority buffering unit 220 may perform queuing functions and transmission functions and forward the selected frames to the corresponding egress ports.

As illustrated in FIG. 2, time aware schedulers 214 are implemented on egress paths of the switch 202. The egress paths may include an egress path using the egress port 206-E, and an egress path using the egress port 208-E. The time aware schedulers 214 may block the non-scheduled queues, so that the corresponding port is idle when the scheduled queue is scheduled for transmission. In some embodiments, an egress path including an egress port 204-E of the internal endpoint port 204 may include a time aware scheduler 214.

Figure 3:
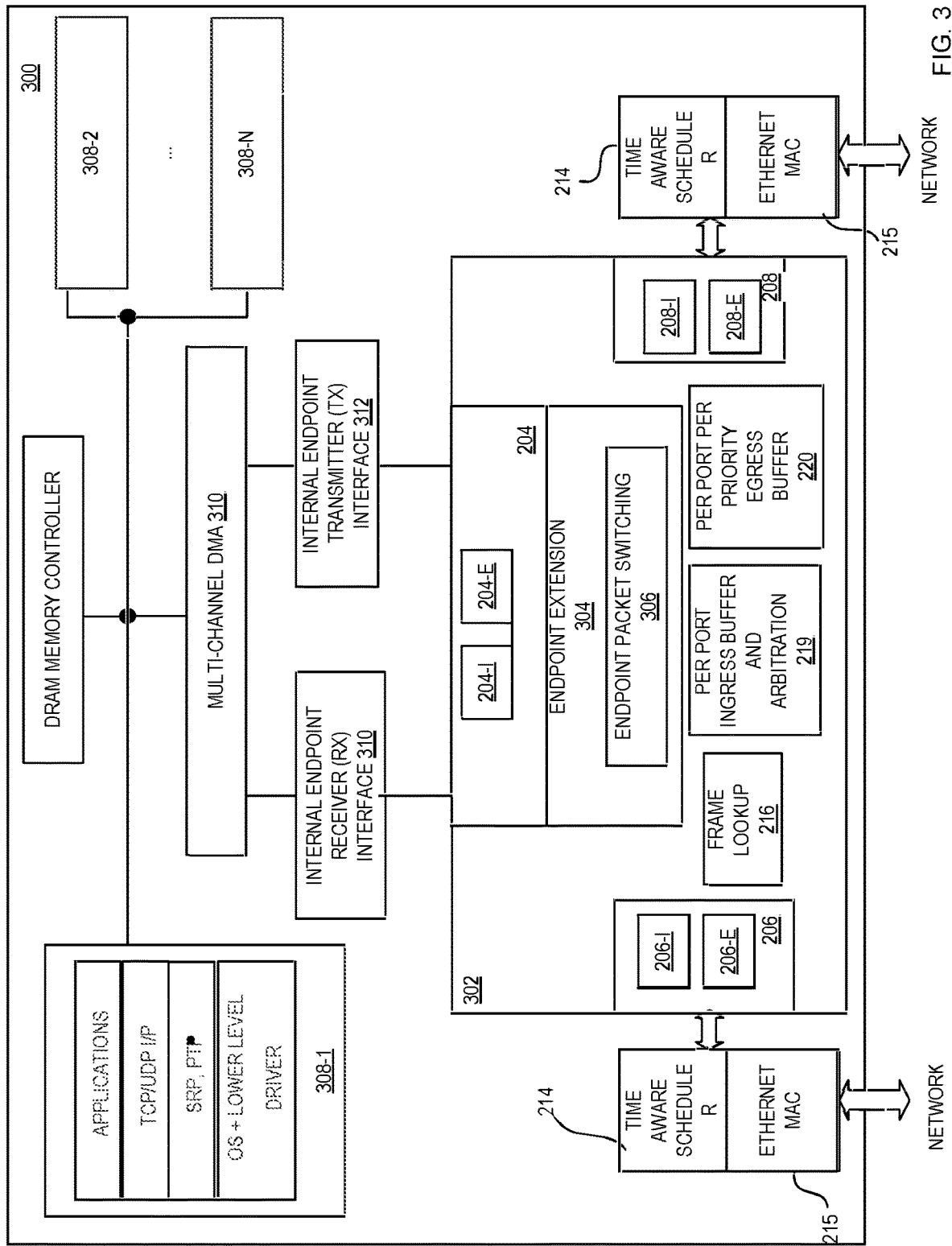
FIG. 3 is a block diagram illustrating another exemplary switch according to some embodiments of the present disclosure.

Referring to FIG. 3, an IC 300 including a network device 302 having three ports supporting multiple internal endpoints (e.g., endpoints 308-1, 308-2, . . . , 308-N) is illustrated. The IC 300 is similar to the IC 200 of FIG. 2 except the differences described below. The switch 302 of the IC 300 includes only three ports 204, 206, and 208. The internal endpoint port 204 connects to multiple internal endpoints 308-1 and 308-2 through internal buses. The network device 302 may be referred to as a switch 302 or a bridge 302 below.

The switch 302 includes an endpoint extension unit 304 to allow extending the number of internal endpoints of the IC 300 from a single internal endpoint to multiple (e.g., 2, 3, . . . , N) internal endpoints, where N is any suitable integer. In some embodiments, two or more endpoints of endpoints 308-1 through 308-N may independently send data to the TSN network, and/or independently receive data from the TSN network. In some embodiments, endpoints 308-1 through 308-N may send data to and receive data from each other. In some embodiments, the switch 302 may be configured to broadcast a frame received from a network port (e.g., network port 208 or 208) to all of the endpoints and the other network port. In some embodiments, the switch 302 may be configured to broadcast a frame received from the internal endpoint (e.g., endpoint 308-$i$) to network ports (e.g., network port 208 or 208) and/or other internal endpoints. Typically, without using the endpoint extension unit 304, a switch needs multiple (e.g., 2, 3, . . . , N) internal endpoint ports to support multiple (e.g., 2, 3, . . . , N) internal endpoints respectively. As shown in the example of FIG. 3, by using the endpoint extension unit 304, a switch 302 with a single internal endpoint port 204 is configured to support two or more endpoints (e.g., endpoints 308-1 through 308-N). In some embodiments, additional endpoints are connected using a multi-channel a multi-channel direct memory access (DMA) 310.

The endpoint extension unit 304 includes an endpoint packet switching unit 306. The endpoint packet switching unit 306 utilizes a multi-channel direct memory access (DMA) 310 to create additional DMA channel(s). In some embodiments, an additional DMA channel establishes an independent communication path between two internal endpoints (e.g., endpoints 308-1 and 308-2). In some embodiments, the multi-channel DMA 310 provides interface(s) between multiple CPU cores of the multiple internal endpoints respectively, where the multiple CPU cores may implement independent operating systems.

In some embodiments, it is considered a violation where an Ethernet bridge forwards a frame received from a particular port to that same particular port. In the example of FIG. 3, the endpoint packet switching unit 306 is used to eliminate such violations. For example, the endpoint packet switching unit 306 with an independent interface is used to bridge frames across the two internal endpoints, e.g., bridging frames between internal endpoints 308-$i$ and 308-$j$, where i and j are integers between 1 and N. In some embodiments, the endpoint packet switching unit 306 may be used as a common endpoint packet switching unit for frames across all priority queues, which reduces cost (e.g., logic element costs).

Figure 4:
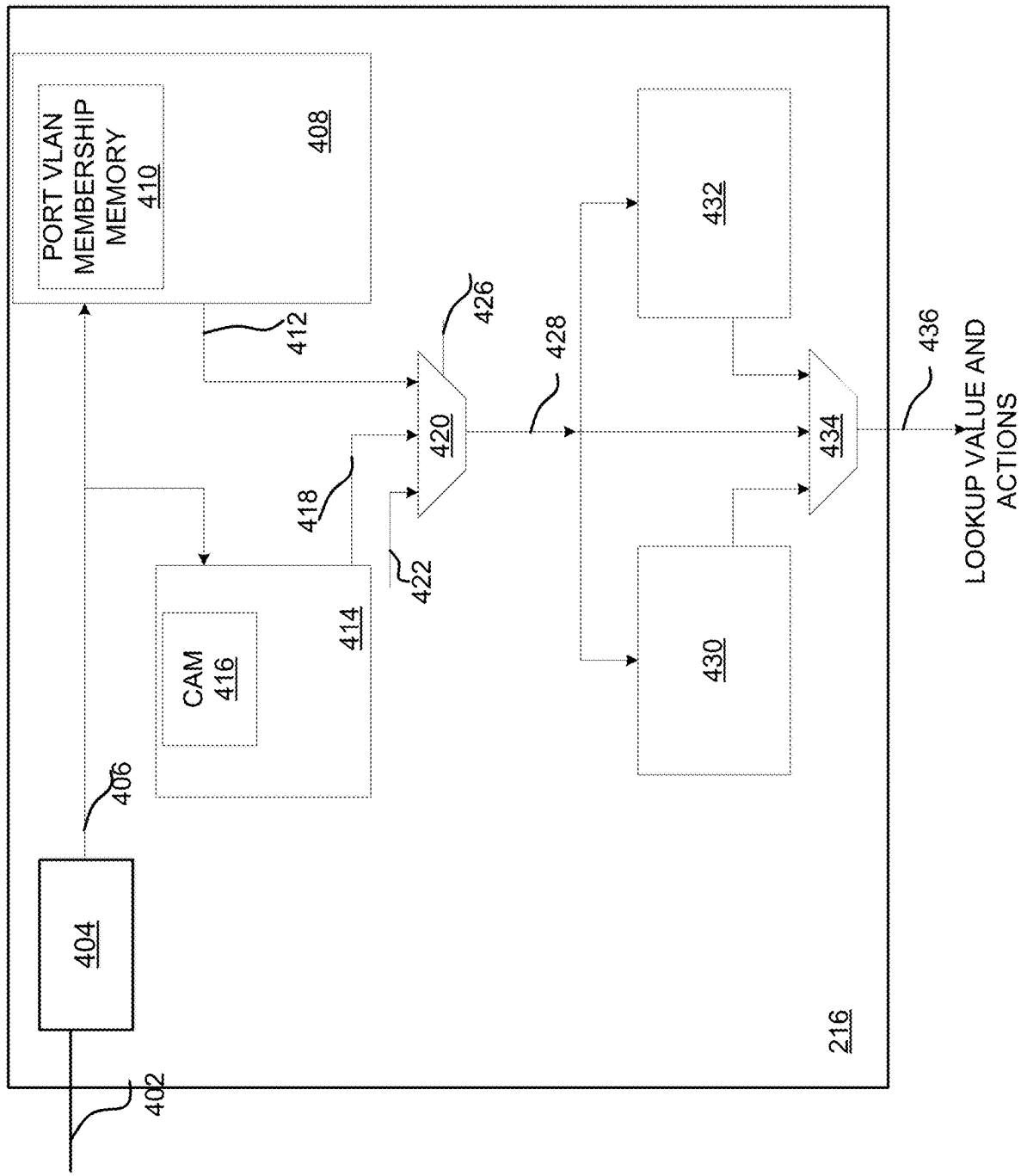
FIG. 4 is a block diagram illustrating a frame lookup unit in a switch for internal endpoint extension according to some embodiments of the present disclosure.

Referring to FIG. 4, an example frame lookup unit 216 (e.g., frame lookup unit 216 of switch 302 of FIG. 3) for internal endpoint extension is illustrated. The frame lookup unit 216 receives a frame 402 of an incoming stream, and sends the frame 402 to a parsing unit 404. The parsing unit 404 may parse the header fields (e.g., destination MAC address, VLAN identifier (ID), priority fields) of the frame 402, and output the parsed frame information 406 including for example, the destination MAC address, VLAN ID, and priority associated with the frame 402.

In the example of FIG. 4, the frame lookup unit 216 may perform the frame lookup process using multiple memories (e.g., a port VLAN membership memory 410 and a content addressable memory (CAM) 416). For example, the frame lookup unit 216 includes a VLAN membership lookup unit 408, which looks up VLAN member ports using a port VLAN membership memory 410 based on the parsed frame information 406 (e.g., by using the VLAN ID of the parsed frame information 406). The VLAN membership lookup unit 408 may then output the VLAN member ports 412 associated with the frame 402. In an example, for registered VLANs, the VLAN membership memory lookup may provide forwarding decisions based on the member ports 412.

In some embodiments, the CAM lookup unit 414 looks up a set of actions associated with the frame 402 using a CAM 416 based on the parsed frame information 406 (e.g., a destination MAC address, VLAN ID, and/or a combination thereof). The actions may include an address translation action, a tagging/un-tagging action, and any other suitable actions. The CAM lookup unit 414 then provides a CAM output 418, which may include actions associated with the frame 402.

As shown in FIG. 4, the frame lookup unit 216 may include an output unit 420 receiving the VLAN member ports 412 from the VLAN membership lookup unit 408, receiving the CAM output 418 from the CAM lookup unit 414, and receiving switch control settings 422 (e.g., from a storage element of the switch 202). The switch control settings 422 may include values associated with the internal endpoint extension, including for example, endpoint MAC addresses (e.g., associated with endpoints 308-1 through 308-N respectively), extended endpoint MAC addresses (e.g., associated with endpoints 308-1 through 308-N respectively), bridge MAC-1 port MAC address and bridge MAC-2 port MAC address (e.g., associated with network ports 206 and 208 respectively and used in layer-2 point-to-point control frames), bridge MAC address (e.g., address associated with network device 302 and used by layer 3 and above control such as SNMP).

In an example, the output unit 420 may process the received VLAN member ports 412, CAM output 418, and switch control settings 422, and provide a frame lookup output 428 based on a lookup level signal 426. In some embodiments, the lookup level signal 426 provides the lookup level(s) for forwarding decisions. In an example where the lookup unit provides a first-level CAM lookup, a second-level address lookup, and a third-level VLAN membership lookup. In an example, for each frame, the frame lookup output 428 may include an egress port ID, frame priority, actions such as address translations, tagging/Un-tagging, and/or a combination thereof. In some embodiments, the frame lookup output 428 may include lookup hit/miss information In some embodiments, the frame lookup unit 216 supports different levels of lookup, including for example, CAM lookup, address comparison lookup, and VLAN membership memory lookup. In an example, multiple levels of lookup are performed in order of the levels (e.g., in the order from higher priority to lower priority).

In some embodiments, the CAM lookup is configured to be a high priority level lookup. For frames received from a network port, the CAM lookup key may be provided using a TSN stream configuration or use hardware address learning for best effort streams.

In some embodiments, example, one or more address comparison lookups (e.g., destination MAC address comparison lookup, source MAC address comparison lookup) may be configured to be a medium priority level lookup. For example, for a frame identified (e.g., with a match) in the CAM lookup, destination MAC address comparison lookup is performed to compare the destination MAC address received in the frame with a predetermined set of MAC address allocated to the network device (e.g., network device 302) including the addresses allocated to the switch and endpoints (e.g., switch 302 and endpoints 308-1 through 308-N). After the destination MAC address comparison lookup determines that there a match for the destination MAC address, the frame is forwarded to the associated ports and endpoints in that network device 302. For further example, for frames received from a network port, source MAC address comparison lookup is performed to compare the source MAC address received in the frame with the predetermined set of MAC address allocated to the network device 302. After the source MAC address comparison lookup determines a match, the frame is dropped to prevent loops in the network.

Furthermore, the VLAN membership lookup may be configured to limit flooding to the ports associated with VLAN.

In various examples, the frame lookup unit 216 performs the multi-priority-level lookups in the order of priority levels (e.g., in the order of CAM lookup, address comparison lookup(s), and VLAN membership lookup). The multi-priority-level lookups may provide forwarding decisions for the incoming frames. In examples where there is a lookup miss for a particular frame after the multi-priority-level lookup, forwarding decisions (e.g., flooding and other suitable forwarding decisions) for that particular frame may be provided by various control register settings.

In some embodiments, a frame includes a destination MAC address that is an 802.1 D defined point-to-point layer-2 control frame address. In those embodiments, the packet switching is performed using a CAM lookup for management frames. A forwarding decision may be determined based on the source MAC Address received in the frame.

In some embodiments, a TSN stream is configured to be forwarded to a group MAC address. In those embodiments, the stream includes frames with a destination MAC address that is a group MAC address. The forwarding to a group MAC address is similar to forwarding point-to-point layer-2 control frames, with a difference that a configuration field (e.g., a management field 582) in CAM and/or VLAN membership memory may be set to a particular value (e.g., "0") that is different for a value (e.g., "1") for the point-to-point layer-2 control frame forwarding. Such a stream may be forwarded on to the other network ports (e.g., network ports 206 and 208) of the switch 302.

In some embodiments, a frame is identified as a broadcast frame. In those embodiments, a broadcast frame received from one of the endpoints (e.g., endpoint 308-1) is forwarded to other endpoints (e.g., endpoints 308-2 through 308-N) and to the network ports (e.g., network ports 206 and 208).

Referring to FIGS. 5A, 5B, and 5C, TSN Bridge Lookup structure implements lookup fields and logic supporting end stations extensions. These fields are applicable only to the frames forwarded to the internal endpoints. The lookup structure provided here allows forwarding frames to either or both of the internal End stations.

Referring to FIGS. 5A-5C, example lookup keys and lookup values for CAM and VLAN lookups are illustrated. FIG. 5A illustrates an example CAM lookup key structure 500 or a portion thereof. For example, the CAM lookup key structure 500 includes a CAM lookup key 502 (e.g., for a unicast destination MAC address), which includes destination MAC address and VLAN ID of the frame. For tagged frames, the frame VLAN ID used in the lookup keys is the same as the VLAN ID received in the frame. For untagged frames, the VLAN ID used in the lookup keys may be the native VLAN ID for the corresponding destination port of the frame (e.g., with a default value of "12'h001"). For further example, the CAM lookup key structure 500 includes a CAM lookup key 504 (e.g., for a group destination MAC address), which includes group destination MAC address and the stream VLAN ID of the frame. Optionally, the CAM lookup key structure 500 (e.g., each of the CAM lookup keys 502 and 504) may include the VLAN priority field (e.g., PRI) as part of the key.

FIG. 5B illustrates an example VLAN lookup key structure 550 or a portion thereof. The VLAN lookup key structure 550 may include a VLAN ID (e.g., for a unicast destination MAC address) or a stream VID (e.g., for a group destination MAC address).

FIG. 5C illustrates a lookup value structure 580 or a portion thereof. The lookup value structure 580 may be used for both the CAM lookup and VLAN membership lookup. In some embodiments, the lookup value structure 580 includes a management (MGMT) field 582, an endpoint port extension field 584, and a port list field 586. The management field 582 indicates whether a frame is to be forwarded to a management layer (also referred to as bridge management layer) of an endpoint (e.g., using a management queue). For example, for a layer-2 point to point control frame (e.g., control frames for protocols like LLDP, STP, PTP), the management field 582 is set to a value (e.g., "1") indicating that the frame is to be forwarded to the management layer. In some embodiments, frames forwarded on a management queue to the CPU include additional information including, for example, frame ingress port id. That additional information may be used for control frame processing for various protocols (e.g., SRP, STP, LLDP). In some embodiments, the management queue also allows control frames originating from an endpoint to be sent on a particular network port. In those embodiments, MAC address associated with a switch port may be used in addition to the MGMT field.

In some embodiments, the endpoint port extension field 584 includes forward decision information including the frame-from-port information, frame-to-port information, and other frame forwarding information. For example, the endpoint port extension field 584 may include forward decision information ("00") indicating that the frame is received from a network port, and is to be forwarded to a first endpoint, forward decision information ("01") indicating that the frame is received from a network port, and is to be forwarded to a second endpoint (an extended endpoint), forward decision information ("10") indicating that the frame is received from a network port and is to be forwarded to all endpoints, or forward decision information (e.g., "11") indicating that the frame is received from an endpoint and is to be packet switched to be forwarded to the network through the network port(s).

Figure 6:
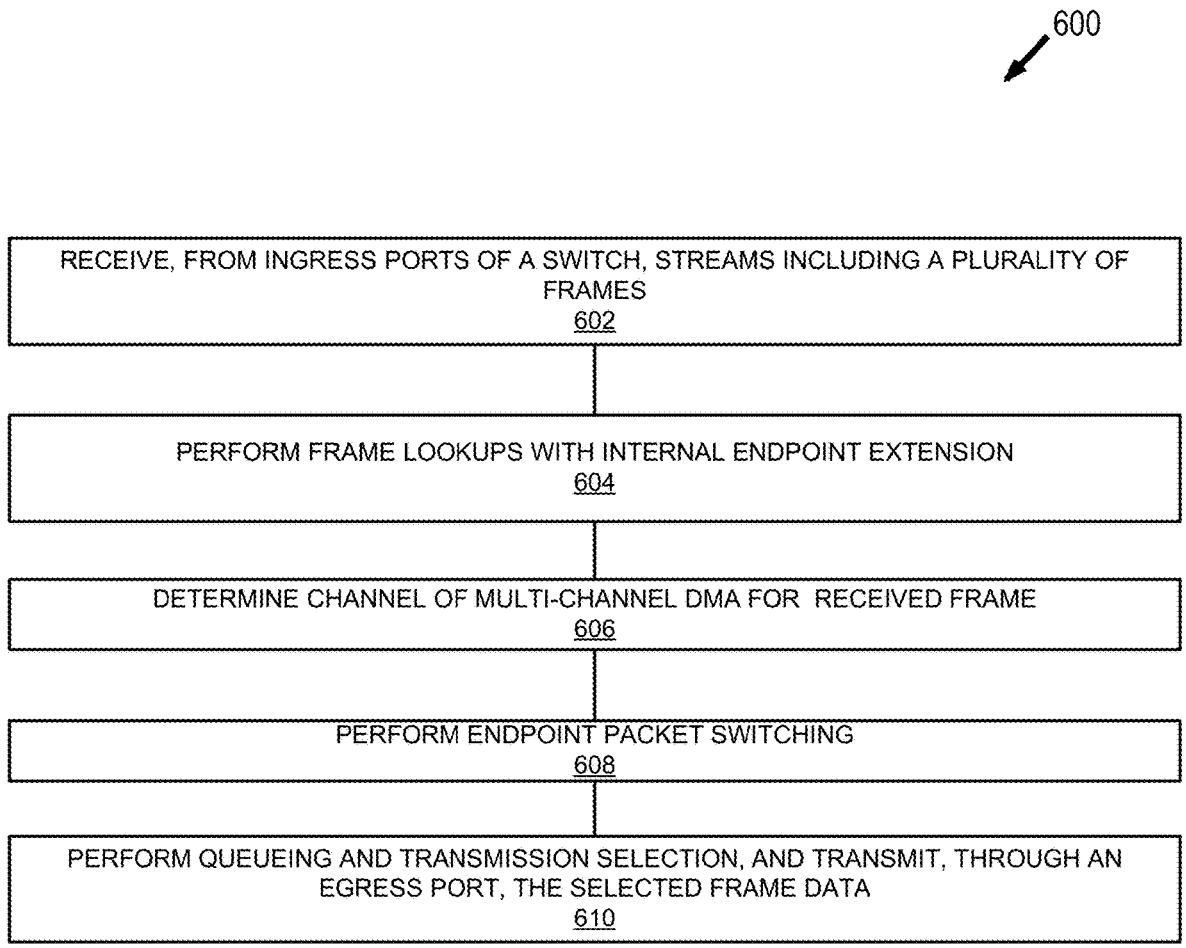
FIG. 6 is a flow diagram illustrating a method for internal endpoint extension according to some embodiments of the present disclosure.

Referring to FIG. 6, illustrated thereof is a method 600 of forwarding frames by a switch (e.g., a switch 302 of FIG. 3) with internal endpoint extension. The method 600 begins at block 602, where a switch receives, from an ingress port (reception port) of the switch, a frame (e.g., as part of high priority TSN stream/Audio Video Bridging (AVB) stream, or low priority best effort traffic). For example, at block 602, one or more ingress ports (e.g., ingress ports 204-I, 206-I, and 208-I) of the switch 302 of FIG. 3 receive Ethernet frame which can get classified as part of high priority TSN stream/AVB stream, or low priority best effort traffic.

The method 600 may then proceed to block 604, where the switch performs a frame lookup process with internal endpoint extension to determine various lookup values associated with the frames. For example, a frame lookup unit 216 of a switch 302 of FIG. 3 performs a frame lookup process to the received frames to determine egress ports, egress priority queue, translations, actions, etc. associated with the frames. As discussed above with reference to FIGS. 3, 4, 5A-5C, in a switch 302 with internal endpoint extension, the frame lookup result from the frame lookup unit 216 includes various information to perform forwarding frames from/to multiple internal endpoints using a single endpoint port 204.

The method 600 may then proceed to block 606, where the endpoint extension unit 304 of the switch 302 may determine one or more channels of a multi-channel DMA for forwarding the received frame. In an example, a first frame to be forwarded to a first endpoint may use a first channel of the multi-channel DMA that is independent of a second channel of the multi-channel DMA, where the second channel is used to forward a second frame to a second endpoint.

The method 600 may then proceed to block 608, where the endpoint packet switching unit 306 of the switch 302 may perform endpoint packet switching in consideration of multiple internal endpoints associated with the single endpoint port 204.

The method 600 may proceed to block 610, where a frame may be sent to different queues based on its priority, marking, and/or associated gate ID. For example, a frame with a scheduled priority is sent to a scheduled traffic queue. In another example, a frame with a reserved priority is sent to a reserved traffic queue. In yet another example, a frame with a best effort priority is sent to a best effort traffic queue. A transmission selection unit may select a frame from the queues and transmit that selected frame through a corresponding egress port of the switch 302.

Figure 7:
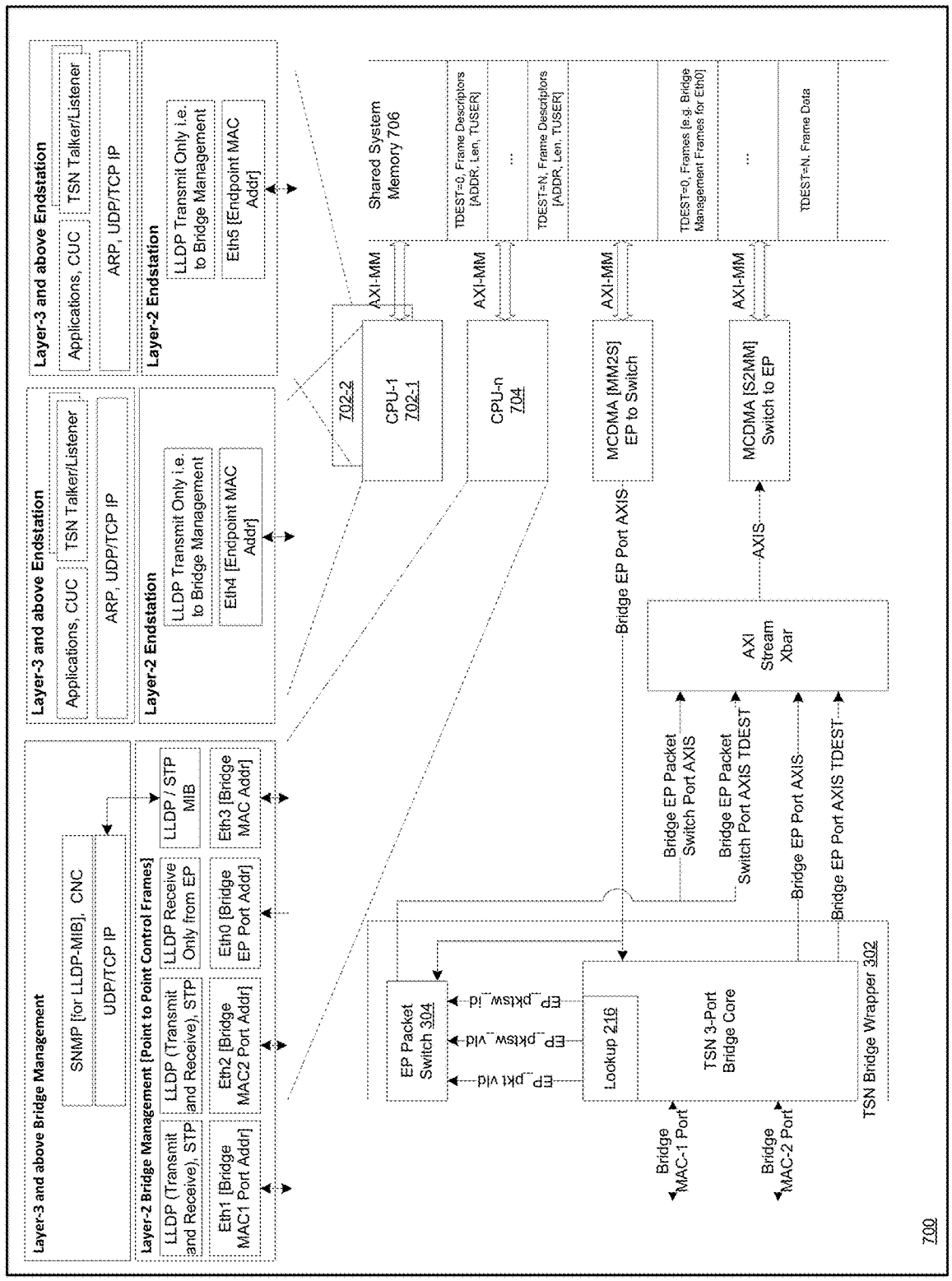
FIG. 7 is a block diagram illustrating an internal endpoint extension system according to some embodiments of the present disclosure.
Figure 8:
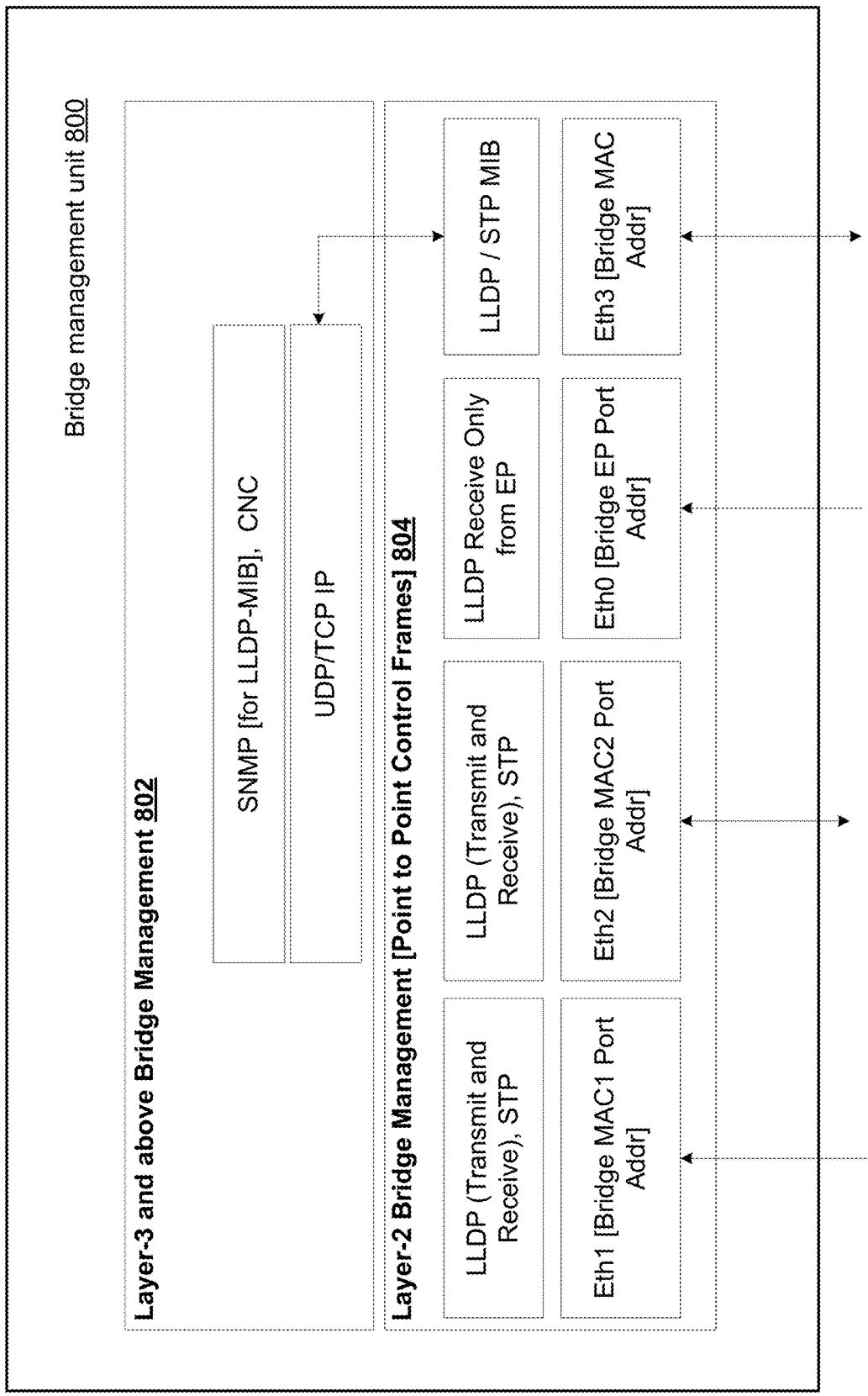
FIG. 8 is a block diagram illustrating an example of an internal endpoint according to some embodiments of the present disclosure.
Figure 9:
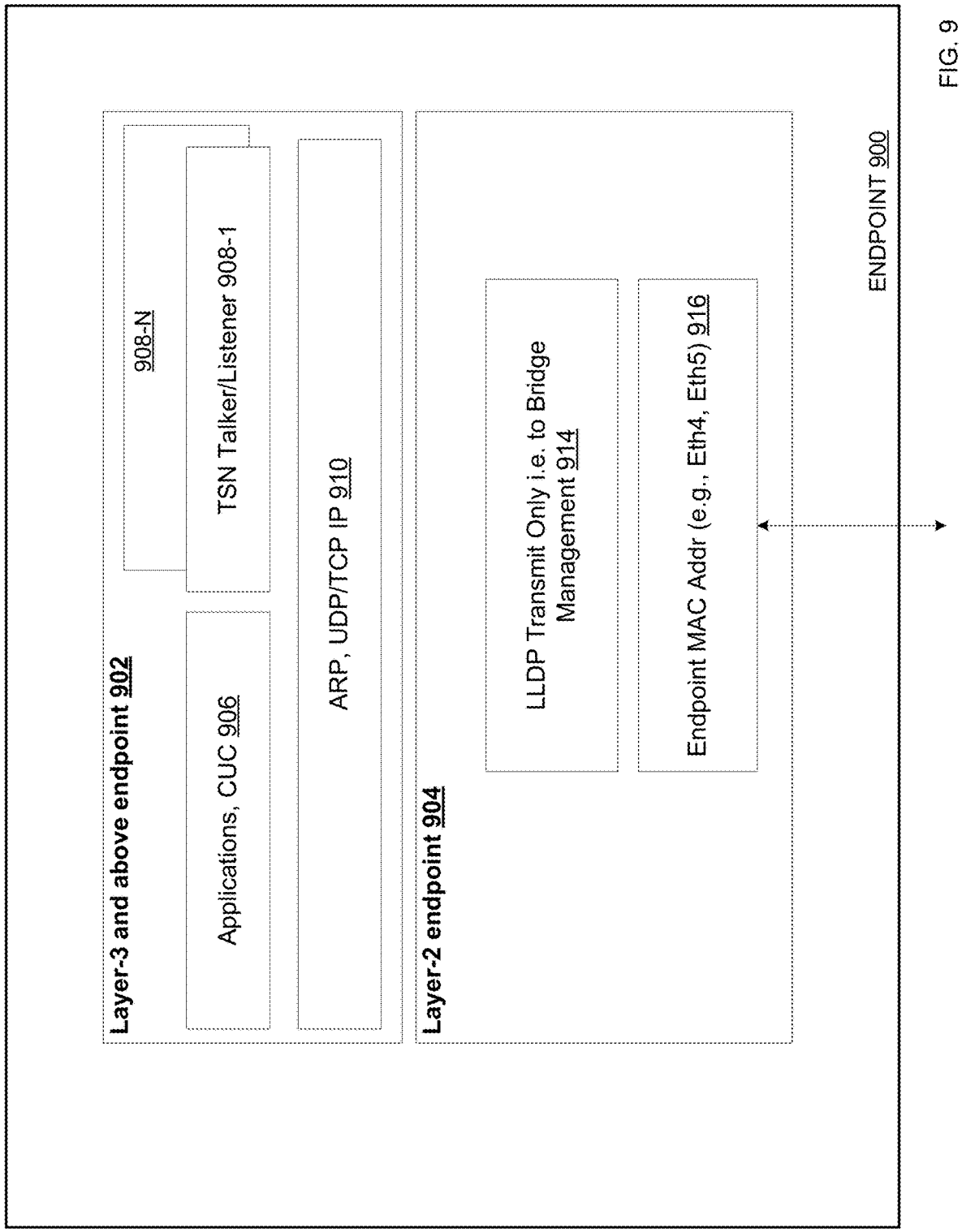
FIG. 9 is a block diagram illustrating another example of an internal endpoint according to some embodiments of the present disclosure.

Referring to FIGS. 7, 8, and 9, endpoint extension operations of an internal endpoint extension system are described. FIG. 7 illustrates an endpoint extension system 700 including multiple internal endpoints (e.g., endpoints 702-1 and 702-2). FIG. 8 illustrates an example bridge management unit (e.g., bridge management unit 704 of FIG. 7) and FIG. 9 illustrate various types of example internal endpoints (e.g., endpoints 702-1 and 702-2 of FIG. 7) that may be implemented in the endpoint extension system 700. Each of the multiple internal endpoints (e.g., endpoints 702-1, 702-2, . . . , 702-N) of the endpoint extension system 700 may be implemented using a processor cluster (e.g., including two or more processors (e.g., four ARM-S3 processors)), a single processor, any other suitable processing system, and/or a combination thereof.

Referring to the example of FIG. 7, an example endpoint extension system 700 implemented in an IC (e.g., IC 300) is illustrated. The endpoint extension system 700 includes multiple internal endpoints (e.g., implemented by processing units 702-1 and 702-2). The endpoint extension system 700 may also include a bridge management layer unit (e.g., implemented by processing unit 704). While only limited numbers of endpoints are illustrated in FIG. 7, the endpoint extension system 700 may include any suitable number of endpoints. For a frame received from a network port (e.g., network port 206 or 208) of a switch 302 (also referred to as a TSN bridge wrapper in the example of FIG. 7), the lookup unit 216 performs lookup operations to determine forwarding decision to one or more endpoints. In an example, the endpoint extension unit 304 (including a packet switch unit) receives frames from the lookup unit 216, and maps the received frames to the associated channels of the multi-channel DMA respectively.

In various embodiments, a multi-channel DMA solution is used to communicate between processing units implementing endpoints respectively (e.g., CPU-1 implementing a first endpoint and CPU-2 implementing a second endpoint). Similarly, endpoints may send control frames (e.g., LLDP control frames) to a bridge management layer (e.g., implemented using a processing unit 704) using the multi-channel DMA (with a separate channel). Each channel of the DMA may provide connectivity to specific endpoint and/or bridge management Layer. Frame Lookup and forwarding decisions based on frame destination/source MAC address may allow packet switching between the internal endpoints and the bridge management layer.

As shown in the system 700, a network device (e.g., a switch 302) is integrated with the internal endpoints 702-1, 702-2 (implemented using respective processing units) and bridge management unit 704 on the same IC (e.g., IC 300). As shown, the internal endpoints 702-1 and 702-2 and the bridge management 704 are coupled to a memory 706 through a bus (e.g., an advanced eXtensible interface (AXI) memory mapped bus (AXI-MM)). AXI is part of ARM Advanced Microcontroller Bus Architecture (AMBA), a family of micro controller buses. Further, the internal endpoints 702-1 and 702-2 and the bridge management unit 704 are coupled to the bridge 302 by way of the AXI-MM and the multichannel DMA 310 (MCDMA). In various embodiments, the MCDMA 310 is utilized to communicate between the processing unit 704 (implementing the Bridge Management Layer) and the processing units 702-1 and 702-2 (implementing the internal endpoints). In some embodiments, the processing units 702-1 and 702-2 (implementing the internal endpoints) may also interface to external non-TSN components, for example, over PCIe, USB, CAN, XADC, or other type of interface. As such, this provides a very flexible TSN end station solution.

In an example, the lookup unit 216 determines that a particular frame needs to be forward to a plurality of endpoints (e.g., endpoints 702-1 and 702-2). The endpoint extension unit 304 sends the particular frame to the associated priority queue of each endpoint in a particular order. For example, the endpoint extension unit 304 sends the particular frame to a corresponding priority queue for endpoint 702-1, and then send the corresponding priority queue for endpoint 702-2. In some embodiments, the order for sending the frame to the multiple endpoints by the endpoint extension unit 304 is determined based on the priority of the particular frame and/or the properties of the corresponding priority queues for the endpoints. For example, the endpoint extension unit 304 may send the particular frame to the corresponding priority queue for endpoint 702-2 before sending that particular frame to the corresponding priority queue for endpoint 702-1 based on a comparison of the queue sizes (e.g., where the corresponding priority queue for endpoint 702-2 is greater than the corresponding priority queue for endpoint 702-1).

In some embodiments, the data rate of the internal endpoint egress port is configured to have a value (e.g. 6.4 Gbps rate i.e. 32×200 MHz) based on the network interfaces 215, such that the endpoint extension does not create any backpressure to the network interfaces. For example, frames may be received from two network ports at 1 Gbps simultaneously, and in examples where there is no duplication, the output data rate should be equal to or greater than 2 Gbps such that no backpressure is generated. When a frame need to be sent to multiple internal endpoints, that frame is duplicated and sent to those multiple internal endpoints, and such duplication may require a minimum output data rate of 4 Gbps. A data rate (e.g., 6.4 Gbps) is chosen such that it is greater than the minimum output data rate (e.g., 4 Gbps) to avoid backpressure. In some embodiments, because the buffer accumulation time is very short for the frames, priority consideration may not be needed and frames are sent in the same order that they are received. In some embodiments, frames received from endpoint port and packet switched to other endpoint/management unit may use a separate AXIS interface (e.g., at 6.4 Gbps).

In some embodiments, the endpoint extension system 700 uses its endpoint packet switching unit 306 to perform packet switching for packets received from and/or sent to the internal endpoints. The endpoint packet switching unit 306 may snoop frames received from endpoint interface (e.g., the endpoint receiver interface), and wait for signals from the lookup unit 216. In some examples, the endpoint packet switching unit 306 receives a signal from the lookup unit 216 indicating that a snooped frame is not required to be looped back. In other words, the snooped frame is not required to be sent back to the internal endpoint where the snooped frame is frame or another internal endpoint. In that example, the endpoint packet switching unit 306 drops that particular snooped frame.

In some examples, the endpoint packet switching unit 306 receives a signal from the lookup unit 216 indicating that a snooped frame needs to be switched back to the internal endpoint, where that snooped frame is to another internal endpoint, or to a network device management unit (e.g., for performing switch/bridge management functions). In various embodiments, bridge management usually uses protocols such STP and LLDP (e.g., STP is used to break loops in the network and create shortest path to destinations, and LLDP is used to create LLDP MIB which gets used by network management processors such as SNMP server). In some embodiments, a bridge by itself does not generate any application data, and the control protocols supported in its bridge management layer are used for establishing a loop free network for network management.

Based on the signal from the lookup unit 216, the endpoint packet switching unit 306 performs a loopback operation for the snooped frame to provide a looped-back frame of the snooped frame. The endpoint packet switching unit 306 may send the looped-back frame to an independent bus interface (e.g., an AXI stream interface, where AXI is part of ARM AMBA, a family of micro controller buses). The independent bus interface may allow a packet switched frame (e.g., the looped-back frame) to be mapped to the associated channel of the multichannel DMA, and send that packet switched frame to the destination using that associated channel. In an example, the TDEST signaling on the AXI Stream interface allows the packet switched frame (e.g., the looped-back frame) to be mapped to the associated channel of the multichannel DMA. In an example, the endpoint packet switching unit 306 may perform the packet switching decision when source MAC address and destination MAC address of a particular frame belong to two internal endpoints respectively.

In various embodiments, multiple processors of various types and partitioning between processors and operating systems implemented therein of the same IC may be performed to support multiple endpoints. For example, a non-real-time processor cluster (e.g., a processor cluster including multiple ARM A53 processors) may be used for lower priority time critical applications (e.g., for an endpoint 702-1). For further example, a real-time processor (e.g., an ARM R5 processor) may be used for high priority time critical applications (e.g., for an endpoint 702-2). Furthermore, by using the time aware DMA, time sensitive applications may be partitioned across the individual processors (e.g., multiple ARM A53 processors) within the same processor cluster.

In some embodiments, because all the endpoints are internal to the same IC in the system 700, they are in the same clock domain. As such, PTP clock synchronization is not needed. In an example, endpoints are edge device (e.g., only connect to a switch/bridge) and do not need to know the network connectivity. As such, STP may not be needed in endpoints (e.g., endpoints 702-1 and 702-2), and only management units for bridges/switches implementing STP is sufficient.

Referring to FIG. 8, illustrated is an example of a bridge management unit 800. The bridge management unit 800 includes a layer-3 and above bridge management portion 802 and a layer-2 bridge management portion (e.g., using point to point control frames) 804. The layer-3 and above bridge management portion 802 includes an SNMP interface (e.g., for LLDP MIB), a CNC interface (e.g., for management of the TSN bridge 302), and a UDP/TCP IP interface. The UDP/TCPIP interface implements UDP/TCPIP protocols and allows communication between the layer-3 and above bridge management portion 802 and the layer-2 bridge management portion 804.

The layer-2 bridge management portion 804 may include network interfaces for managing point-to-point control frames. For example, a network interface 'Eth0' (corresponding to the bridge endpoint port 204 address) may receive a point-to-point layer-2 control frame (LLDP) from the internal endpoint 702-1 on a first DMA channel and/or from the internal endpoint 702-2 on a second DMA channel, a network interface 'Eth1' (corresponding to the TSN bridge 302 MAC1 port address) may send or receive a layer-2 point-to-point control frame (LLDP, STP, PTP) to or from the bridge MAC1 port on a third DMA channel, a network interface 'Eth2' (corresponding to the TSN bridge 302 MAC2 port address) may send or receive a layer-2 point-to-point control frame (LLDP, STP, PTP) to or from the bridge MAC2 port on a fourth DMA channel, and a network interface 'Eth3' (corresponding to the TSN bridge 302 MAC address) may send or receive layer-3 and above control frames to or from the bridge 302 (e.g., using SNMP) on a fifth DMA channel. More details regarding how separate DMA channels may be used are described below with reference to FIG. 13.

Referring to FIG. 9, illustrated is an example of an internal endpoint 900 (e.g., internal endpoint 702-1 or 702-2). The internal endpoint 900 may be implemented using various types of processors (e.g., a real time processor (e.g., an ARM R5 real time processor), a non-real-time processor, a cluster, etc.) The internal endpoint 900 includes a layer-3 and above endpoint portion 902 and a layer-2 endpoint portion 904. The layer-3 and above endpoint portion 902 includes applications 906, TSN talker/listeners 908-1 through 908-N, and an ARP/UDP/TCPIP interface 910. The ARP/UDP/TCPIP interface 910 implements ARP/UDP/TCPIP protocols and allows communication between the layer-3 and above extended endpoint portion 902 and a layer-2 extended endpoint portion 904.

In the example of FIG. 9, the layer-2 endpoint portion 904 may include management unit 912 performing frame management associated with a particular endpoint interface (e.g., endpoint interface 916 communicating with the endpoint port 204 and/or the address of the endpoint interface) that the management unit 912 is associated with.

The management unit 912 includes a protocol configuration unit 914 and an endpoint interface 916. The protocol configuration 914 implements various protocols for communication, including for example, Link Layer Discovery Protocol (LLDP), any other suitable network protocol, and/or a combination thereof.

It is noted that IEEE standards define that the LLDP protocol allows for "Transmit Only", "Receive Only" or "both Transmit and Receive" operations. In the example of FIGS. 7, 8, and 9, the endpoint is configured for LLDP "Transmit Only" operations (to the bridge management layer) (e.g., via the "Eth4" or "Eth5" network interface). As shown in FIGS. 7, 8, and 9, both Bridge MAC ports (Bridge MAC1 Port and Bridge MAC2 Port) are configured for "Transmit and Receive" LLDP operations via the 'Eth1' and 'Eth2' network interfaces. In an example, only the Bridge (the TSN bridge 302) is allowed to build and maintain LLDP MIB information (e.g., via the 'Eth3' network interface). However, LLDP MIB information in the Bridge also provides information about the internal endpoints. This particular usage is helpful, for example, when there is only one CPU core implementing both Bridge Management Layer and End Station functions. In such a case, the Bridge MAC Address and the End Station MAC Address are shared. Alternatively, when independent CPU cores and their associated operating systems are used, the endpoints and the Bridge can have independent MAC addresses and can also have LLDP to be configured in "Transmit and Receive" mode. In such an example, the endpoints can also store LLDP MIB information.

Figure 10:
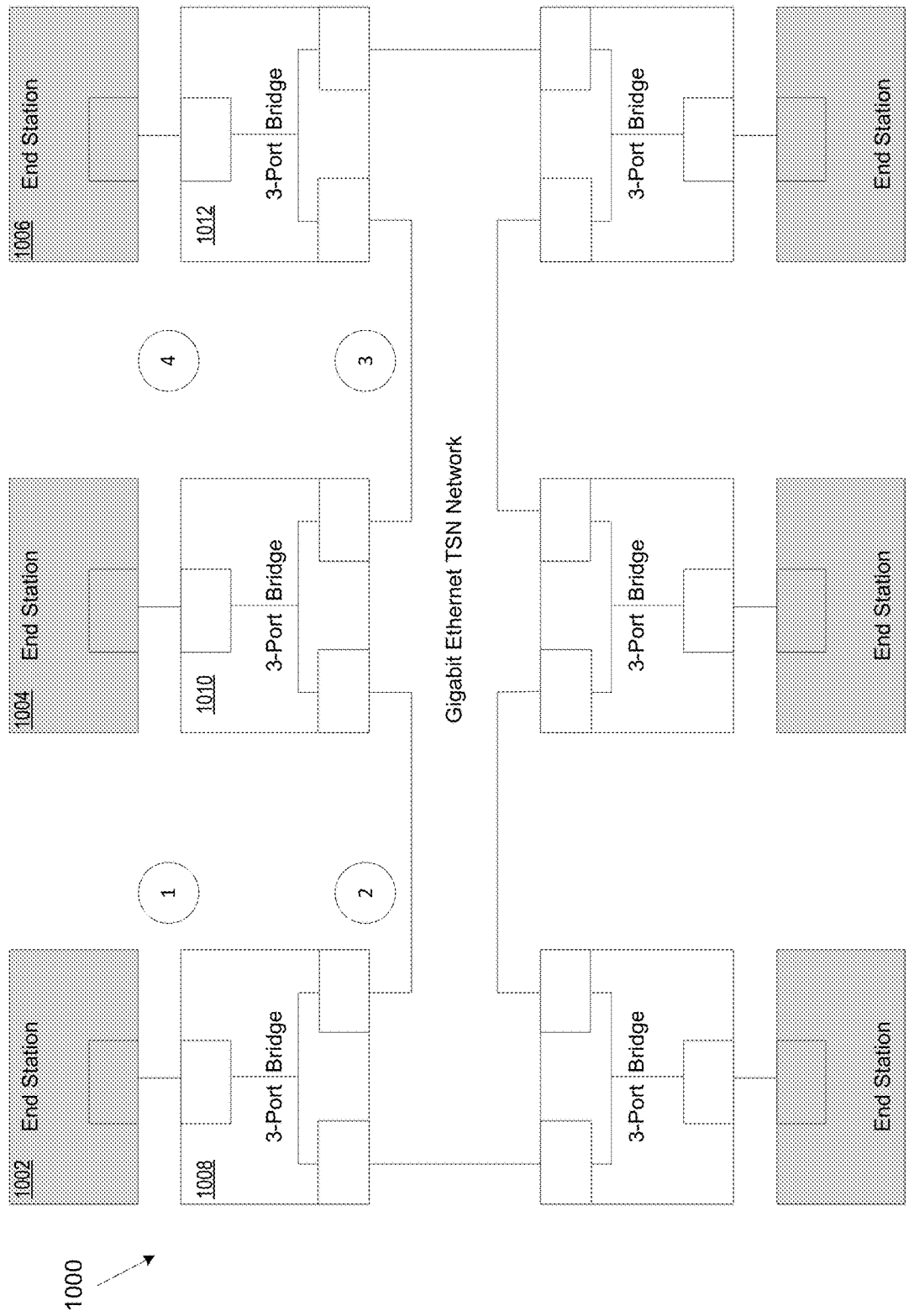
FIG. 10 is a block diagram illustrating an example network system according to some embodiments of the present disclosure.
Figure 11:
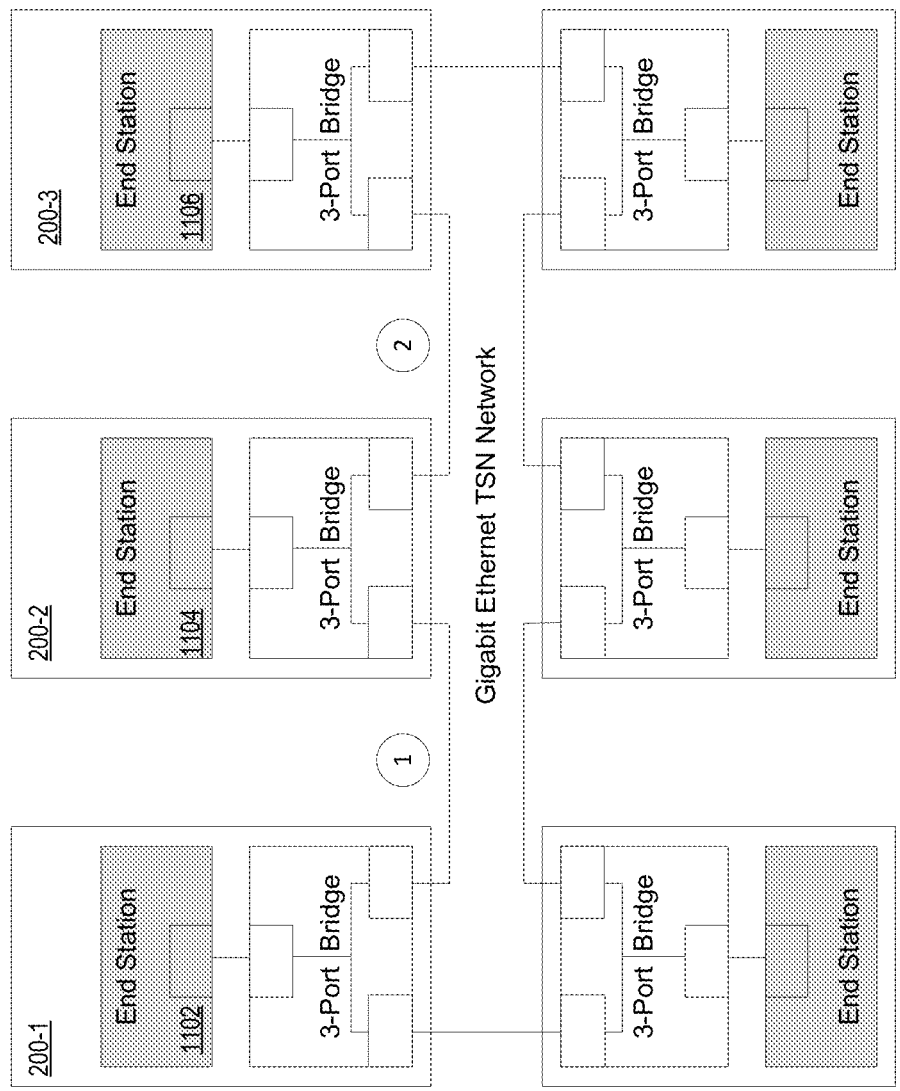
FIG. 11 is a block diagram illustrating another example network system according to some embodiments of the present disclosure.
Figure 12:
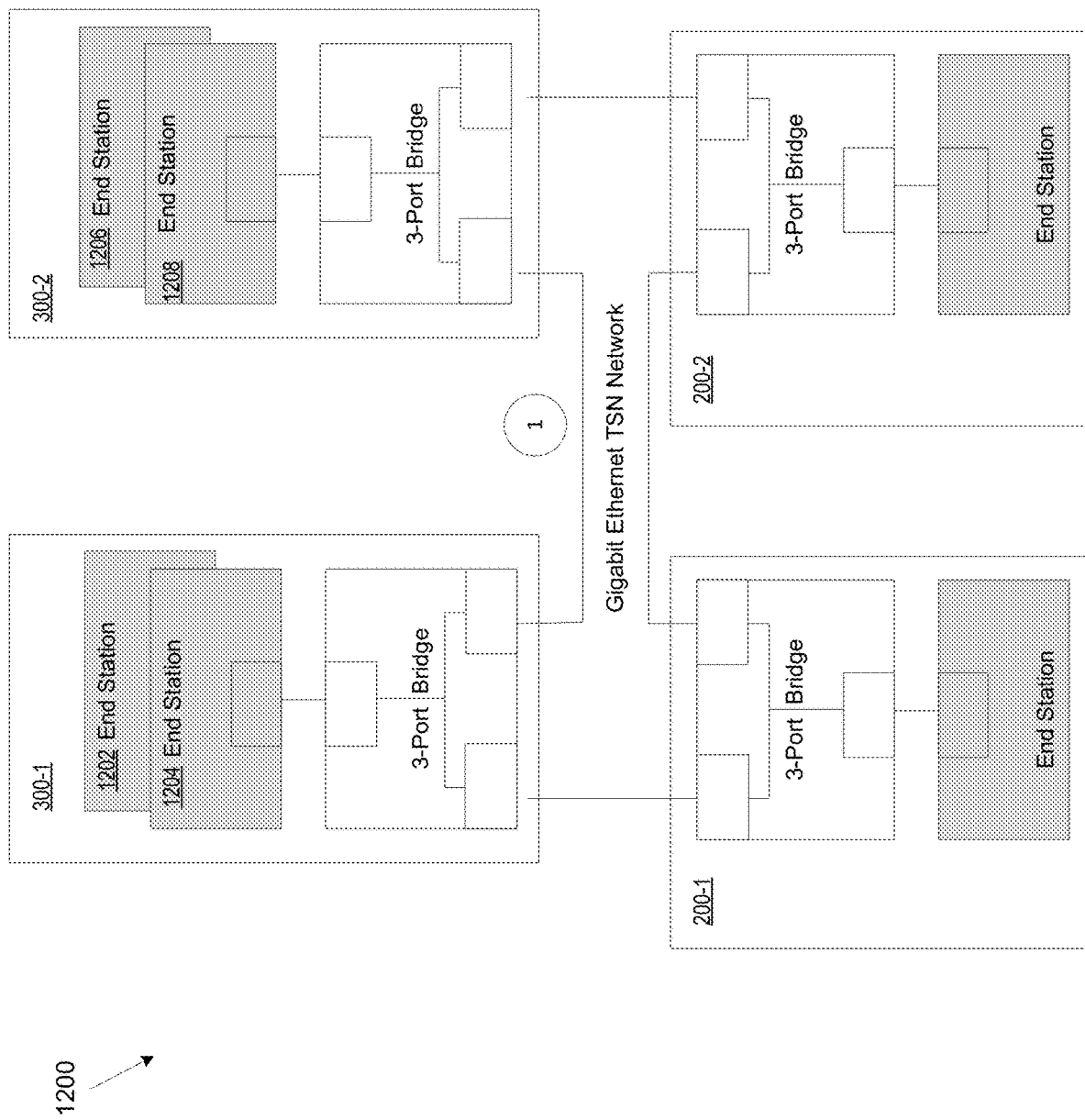
FIG. 12 is a block diagram illustrating another example network system according to some embodiments of the present disclosure.

Referring to FIGS. 10, 11, and 12, illustrated are various TSN network settings using endpoints separate (e.g., not in the same IC) from switches/bridges (e.g., FIG. 10), switches each having a single integrated endpoint (e.g., FIG. 11), and switches each with extended endpoints (e.g., FIG. 12). As explained in detail below, by using extended internal endpoint systems, network performance is improved by reducing network hops. In systems with extended internal endpoints, an IC may include I/O components (e.g., ADC, SelectIO, PCIe) providing interface to on-chip real-time or non-real-time processor to create internal endpoints. In those systems, each endpoint may be implemented using an independent processing unit (e.g., a CPU with a separate/different OS) that may run independent applications, and those processing units may be of different types (e.g., cluster, single-processor, real-time, non-real-time, etc.) and implement different OS.

As shown in FIG. 10, network system 1000 includes endpoint 1002 connected through network to bridge 1008, endpoint 1004 connected through network to bridge 1010, and endpoint 1006 to bridge 1012. As such, communication between endpoints 1002 and 1004 uses at least three network hops, and communication between endpoints 1002 and 1006 uses at least four network hops.

As shown in FIG. 11, network hops for communication between endpoints are reduced by using switches/bridges with integrated endpoints. In network system 1100 of FIG. 11, network devices 200-1, 200-2, 200-3 (e.g., IC 200) include integrated switches and endpoints 1102, 1104, and 1106 respectively. As such, communication between endpoints 1102 and 1104 uses only one network hop, and communication between endpoints 1102 and 1106 uses only two network hops.

As shown in FIG. 12, network hops for communication between endpoints are further reduced by using switches/bridges each with multiple integrated endpoints using the endpoint extension system. In network system 1200 of FIG. 12, network device 300-1 (e.g., IC 300) includes a switch (e.g., switch 302) and integrated endpoints 1202 and 1204, and network device 300-2 (e.g., IC 300) includes a switch (e.g., switch 302) and integrated endpoints 1206 and 1208. As such, communication between endpoints 1202 and 1204 uses no network hop, and communication between endpoints 1202 and 1206 uses only a single network hop.

Referring to FIG. 13, example DMA channel configurations 1302 through 1314 for DMA channels of a multi-channel DMA in an internal endpoint extension system are illustrated. As shown in the example of FIG. 13, a multi-channel DMA may include a plurality of channels (e.g., channel-0 through channel-6). Specifically, channel-0 through channel-2 are connected to an interface of a first endpoint (e.g., Eth-4 endpoint Ethernet interface), and channel-3 through channel-5 are connected to an interface of a second endpoint (e.g., Eth-5 extended endpoint Ethernet interface). Channel-6 is used for bridge management, and may connect to Eth-0 through Eth-3 for bridge management layer. In some embodiments, TSN bridge register configurations allows for programming MAC Address associated with bridge [i.e. ETH-0 through ETH-3] and MAC Address associated with one or more endpoints [i.e. ETH-4 & ETH-5]. These MAC Address can be in the source or destination MAC address field of the frames received from bridge endpoint port (e.g., endpoint port 204). Frame forwarding decisions may be determined based on comparing frame source and destination MAC Address fields with the configured set of MAC Address in the bridge registers.

In the example of FIG. 13, as provided by DMA channel configuration 1302, channel-0 provides connectivity for endpoint scheduled queue, is used by an endpoint ethernet interface (e.g., Eth-4 of a first endpoint), and provides data communication for a highest priority scheduled queue. As provided by DMA channel configuration 1304, channel-1 provides connectivity for endpoint reserved queue, is used by an endpoint ethernet interface (e.g., Eth-4), and provides data communication for second highest priority reserved queue. As provided by DMA channel configuration 1306, channel-2 provides connectivity for endpoint best effort queue, is used by an endpoint ethernet interface (e.g., Eth-4), and provides data communication for best effort queue. Channel-2 may also provide communication for layer-2 and above control frames for various protocols like LLDP, ARP, and SNMP.

In the example of FIG. 13, DMA channel configurations 1308, 1310, and 1312 and substantially similar to DMA channel configurations 1302, 1304, and 1306 respectively, except that the corresponding DMA channels (channel-3, channel-4, and channel-5) are used by an endpoint ethernet interface of another endpoint (e.g., Eth-5 of a second endpoint).

In the example of FIG. 13, DMA channel configuration 1314 provides that DMA channel-6 provides connectivity for bridge management, is used by Ethernet interface for bridge management layer (e.g., Eth-0, Eth-1, Eth-2, Eth-3), and provides data communication for point to point layer-2 control frames (e.g., STP, LLDP, PTP) between network ports (e.g., network ports 206 and 208) and internal endpoints.

Figure 14:
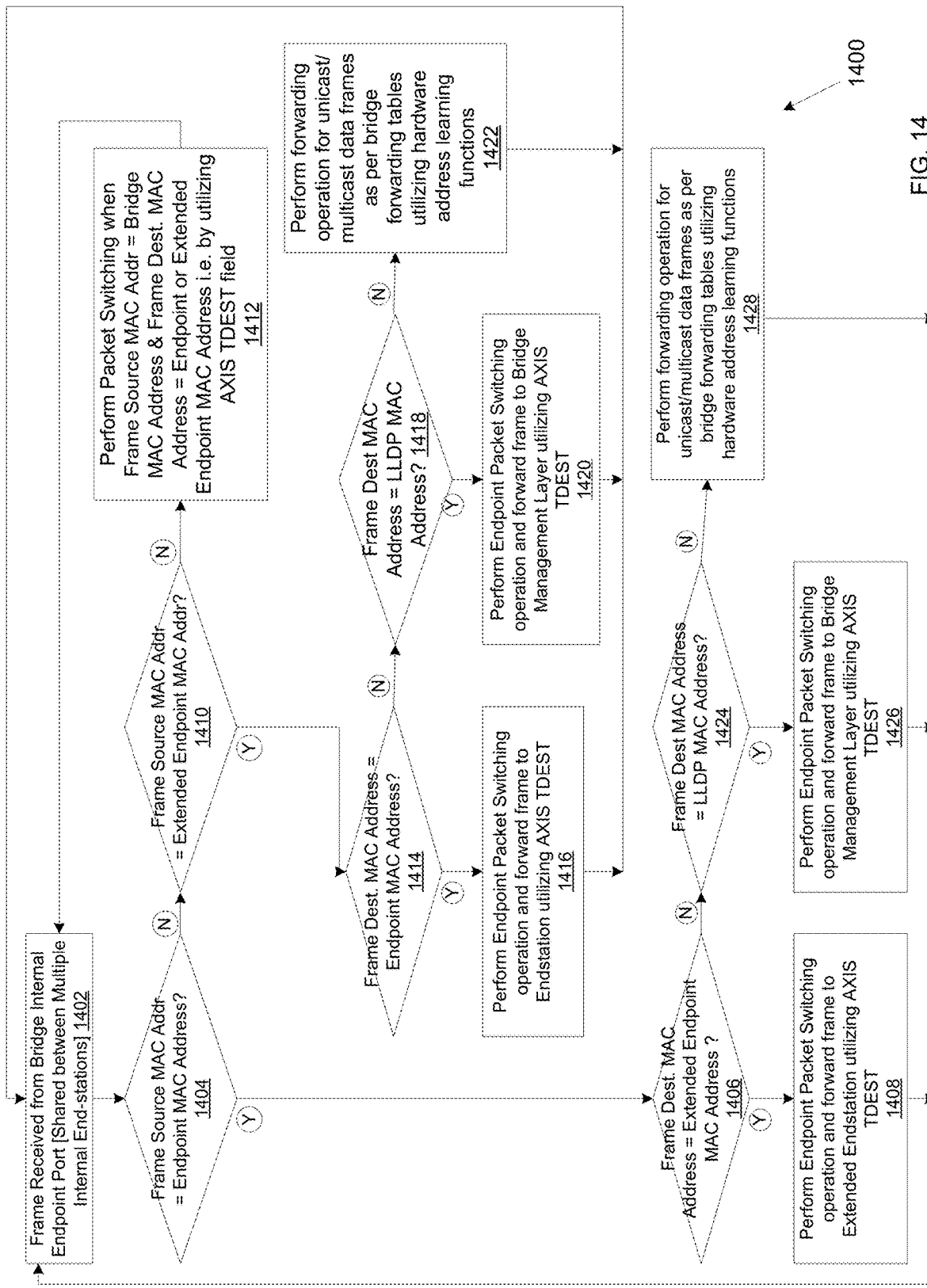
FIG. 14 is a flow diagram illustrating a method for internal endpoint extension, in accordance with some embodiments.

Referring to FIG. 14, the method 1400 provides a method for internal endpoint extension including handling frames received at endpoint port (e.g., endpoint port 204) in accordance with some embodiments. In various embodiments, a frame received from an endpoint port (e.g., endpoint port 204) may be a broadcast or multicast frame. A broadcast frame may be sent to all network ports (e.g., network ports 206 and 208) and other endpoint(s) (e.g., by packet switching). Multicast frames may be sent to the multicast group or a port list associated with the multicast frame. At least some aspects of the method 1400 may be performed by the endpoint extension unit 304 and endpoint packet switching unit 306. It is noted that while in the example below, a first endpoint is referred to as an endpoint and a second endpoint is referred to as an extended endpoint, in various embodiments, either one of the first and second endpoints may be an endpoint and the other of the first and second endpoints may be an extended endpoint.

The method 1400 begins at block 1402, where a frame is received from the internal endpoint port 204 of the switch 302. By way of example, the received frame may include a point-to-point control frame. In various embodiments, the internal endpoint port 204 may be shared multiple internal end stations (e.g., endpoints 308-1, 308-2, . . . , 308-N.). In some embodiments, the method 1400 proceeds to block 1404 where it is determined whether a frame source MAC address of the received is the same as an endpoint MAC address.

As shown in the loop including blocks 1402, 1404, 1406, and 1408, if it is determined (at block 1404) that the received frame's source MAC address is the same as the MAC address of the first endpoint, then the method 1400 proceeds to block 1406. If at block 1406 it is determined that a destination MAC address of the received frame is the same as the MAC address of the second endpoint, then the method 1400 proceeds to block 1408, where endpoint packet switching is performed and the received frame is forwarded to the second endpoint (e.g., utilizing AXIS TDEST and the corresponding channel of the multichannel DMA).

As shown in the loop including blocks 1402, 1404, 1410, and 1412, if it is determined (at block 1404) that the received frame's source MAC address is not the same as the MAC address of the first endpoint, then the method 1400 proceeds to block 1410. If at block 1410 it is determined that the source MAC address of the received frame is the same as the MAC address of the second endpoint, then the method 1400 proceeds to block 1412, where endpoint packet switching is performed (e.g., utilizing AXIS TDEST and the corresponding channel of the multichannel DMA) when the frame source MAC address is the same as the bridge MAC Address and the frame destination MAC address is the same as the MAC address of one of the first and second endpoints.

As shown in the loop including blocks 1402, 1404, 1410, 1414, and 1416, if it is determined that the received frame is from the second endpoint (block 1410) and is to be sent to the first endpoint (block 1414), the endpoint packet switching is performed and the received frame is forwarded to the first endpoint (e.g., utilizing AXIS TDEST and the corresponding channel of the multichannel DMA) (block 1416).

As shown in the loop including blocks 1402, 1404, 1410, 1414, 1418, and 1420, if it is determined that the received frame is from the second endpoint (block 1410) and is a layer-2 point to point control frame (e.g., control frames for protocols like LLDP with an LLDP destination MAC address) (block 1418), the received frame is to be forwarded to the bridge management layer. The method goes to block 1420, where the endpoint packet switching is performed, and the received frame is forward to a bridge management layer (e.g., utilizing AXIS TDEST and the corresponding channel of the multichannel DMA) (block 1420). In some examples, TDEST signaling provides destination signaling for automatic routing through AXI Stream Interconnects. After block 1420, the method 1400 may proceed to block 1402 where a subsequent frame is received from the internal endpoint port.

As shown in the loop including blocks 1402, 1404, 1410, 1414, 1418, and 1422, if it is determined that the received frame is from the second endpoint (block 1410) and is not with the LLDP destination MAC address (block 1418), forwarding operation for unicast/multicast data frames is performed (e.g., as per bridge forwarding tables utilizing hardware address learning functions).

In the example of FIG. 14, the loop including blocks 1402, 1404, 1406, 1424, and 1426 is substantially similar to the loop including 1402, 1404, 1410, 1414, 1418, and 1420 described above. Furthermore, the loop including blocks 1402, 1404, 1406, 1424, and 1428 is substantially similar to the loop including 1402, 1404, 1410, 1414, 1418, and 1422 described above. The difference is that in these two loops including blocks 1426 and 1428, it is determined that the received frame is from the first endpoint instead of the second endpoint.

Figure 15:
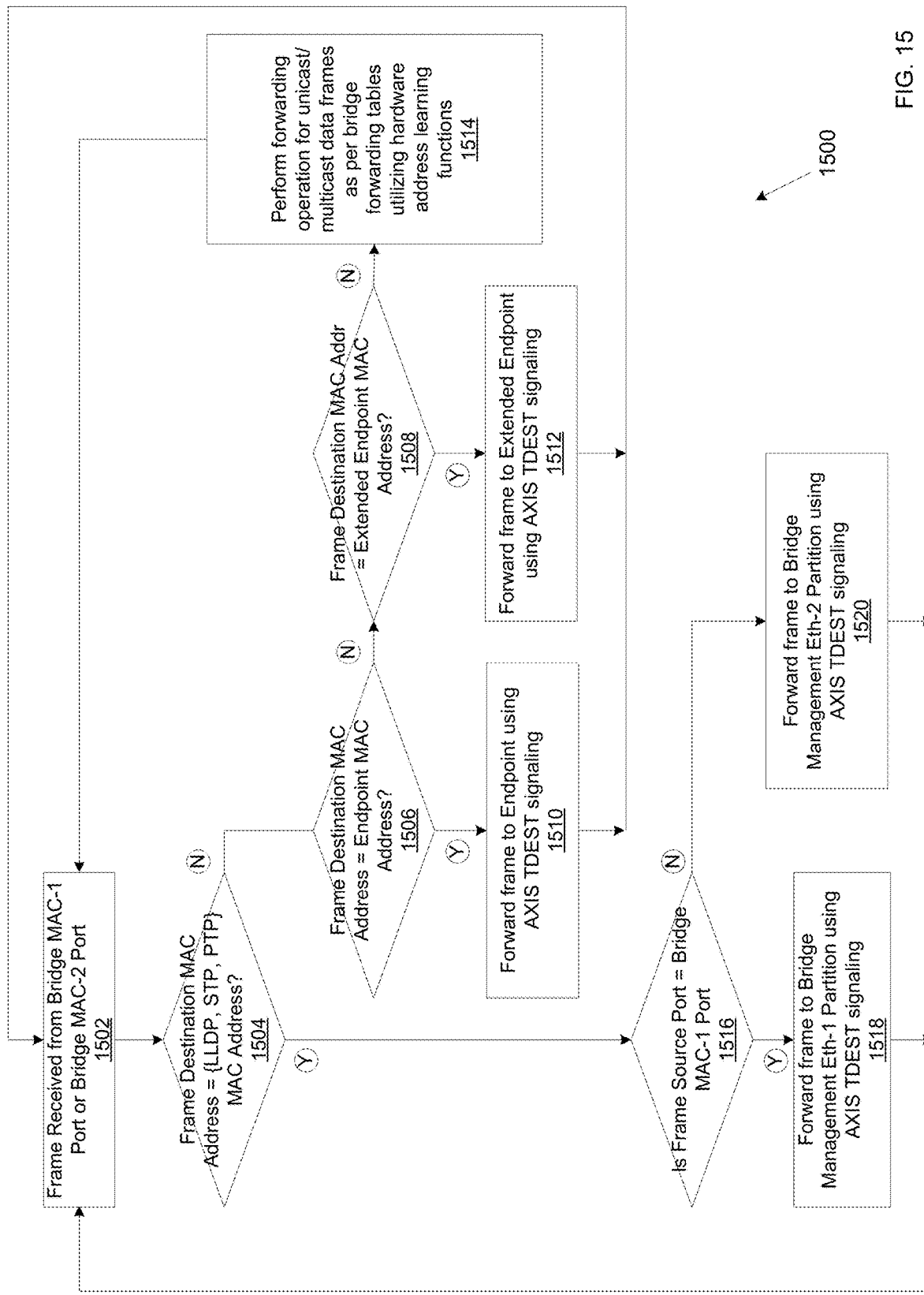
FIG. 15 is a flow diagram illustrating a method for internal endpoint extension, according to some embodiments.

Referring first to FIG. 15, the method 1500 provides a method for internal endpoint extension including handling frames received at network ports (e.g., network ports 206 and 208) in accordance with some embodiments. A frame received from a network port may be a broadcast or multicast frame. A broadcast frame may be sent to all of the endpoints and to the other network port. Multicast frames may be sent to the multicast group or port list associated with the multicast frame. At least some aspects of the method 1500 may be performed by the endpoint extension unit 304 and endpoint packet switching unit 306. It is noted that while in the example below, a first endpoint is referred to as an endpoint and a second endpoint is referred to as an extended endpoint, in various embodiments, either one of the first and second endpoints may be an endpoint and the other of the first and second endpoints may be an extended endpoint.

The method 1500 begins at block 1502 where a frame is received from the bridge MAC-1 port or the bridge MAC-2 port (e.g., as shown in FIGS. 3 and 7). In some embodiments, the method 1500 proceeds to block 1504 where it is determined whether a destination MAC address of the received frame includes a supported layer-2 protocol MAC address (e.g., where the received frame may include a point-to-point control frame). For instance, it may be determined whether the destination MAC address of the received frame includes an LLDP MAC address, an STP MAC address, or a PTP MAC address.

In some examples, it is determined (at block 1504) that the received frame does not include a supported layer-2 protocol MAC address. In those examples, the method 1500 proceeds to blocks 1506/1508 to determine whether the frame destination address includes the first endpoint MAC address (at block 1506) or the second endpoint MAC address (at block 1508). If it is determined at blocks 1506/1508 that the frame destination address includes MAC address for the first/second endpoint, then the received frame is forwarded to the corresponding first/second endpoint (at blocks 1510 and 1512 respectively). In some examples, AXIS TDEST signaling and corresponding channel of the multichannel DMA.

In some examples, it is further determined (at blocks 1506 and 1508) that the frame destination address does not include MAC address for any of the first and second endpoints, the method 1500 may proceed to block 1514, where a forwarding operation for unicast/multicast data frames (e.g. as per bridge forwarding tables utilizing hardware address learning functions) is performed.

In some examples, it is determined (at block 1504) that the received frame does include a supported layer-2 protocol MAC address. In those examples, the method 1500 proceeds to block 1516, where it is determined whether the source port of the received frame is equal to the bridge MAC-1 port (e.g., one of the network ports 206 and 208). If it is determined (at block 1516) that the source port of the received frame is the bridge MAC-1 port, then the method 1500 proceeds to block 1518, where the frame is forwarded to the bridge management Eth1 network interface utilizing TDEST signaling. After block 1518, the method 1500 may proceed to block 1502 where a subsequent frame is received from the bridge MAC-1 port or the bridge MAC-2 port.

In some examples, it is determined (at block 1516) that the source port of the received frame is the second network port (e.g., not equal to the bridge MAC-1 port). In those examples, it is determined that the source port of the received frame is the bridge MAC-2 port (e.g., the other of network ports 206 and 208) and thus the method 1500 proceeds to block 1520, where the frame is forwarded to the bridge management Eth2 network interface utilizing TDEST signaling. After block 1520, the method 1500 may proceed to block 1502 where a subsequent frame is received from the bridge MAC-1 port or the bridge MAC-2 port.

In some embodiments, point-to-point control frames received from the bridge input port(s) (e.g., network ports 206 and 208) are forwarded only to the bridge management layer (e.g., processing unit 704 of FIG. 7). In some embodiments, frames received from the bridge MAC-1 Physical Port are forwarded to the bridge management Eth1 network interface, frames received from the bridge MAC-2 Physical Port are forwarded to the bridge management Eth2 network interface, and frames received from the internal endpoints (e.g., processing units 702-1, 702-2) on the bridge endpoint port are forwarded to the bridge management Eth0 network interface.

It is noted that various configurations (e.g., the number of ports of the switch 202, the frame priorities) illustrated in FIGS. 2 through 15 are exemplary only and not intended to be limiting beyond what is specifically recited in the claims that follow. While examples for an integrated endpoint extension system including a three-port network device where a single endpoint port supports multiple endpoints are illustrated, a person skilled in the art will recognize that the integrated endpoint extension system may be extended to other embodiments. In various embodiments, the network device may include two or more endpoint ports. Each endpoint port may be used to support one or more endpoints. Various configurations (e.g., the number of endpoint ports of the network device, the number of endpoints each endpoint port supports, etc.) may be configured based on the partition of applications among the endpoints, the bandwidth requirements of various applications, etc. Furthermore, the endpoint extension system may be configured for an IC associated with three or more network ports. For further example, while the exemplary lookup keys include MAC+VLAN ID, the lookup keys may be generated based on IP Octuple, SDNET, or any other suitable lookup key generation methods.

One or more elements in embodiments of the invention may be implemented by software, hardware (e.g., an application specific integrated circuit (ASIC), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. In some examples, for FPGA implementations, the switch 202 may be implemented as logic in FPGA fabric, and an embedded processor and memory may provide the necessary system software. In those examples, integrated components (e.g., ADC, DAC) in an FPGA IC may further assist the various functions including for example the endpoint functions. For TSN solutions, the embodiments described herein improve significantly the cost benefits associated with the integration of TSN components.

When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device. The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. An integrated circuit (IC) device, comprising:
   a network device comprising:
      a first network port for connecting to a network;
      a second network port for connecting to the network; and
      an internal endpoint port for connecting to a first endpoint including a first processing unit and a second endpoint including a second processing unit;
      a lookup circuit for determining a first forwarding decision for forwarding a first frame to the first endpoint;
      a memory channel configuration unit for:
         providing a first plurality of memory channels for communicating, to the first endpoint, frames for a plurality of priority queues respectively; and
      an endpoint extension circuit for:
         determining a memory channel of the first plurality of memory channels based on the first forwarding decision for forwarding the first frame to the first endpoint; and
         forwarding the first frame to the first endpoint using the determined memory channel.

2. The IC device of claim 1, wherein the determined memory channel is a direct memory access (DMA) channel provided by a multi-channel DMA controller.

3. The IC device of claim 1, wherein the lookup circuit includes:
   a content addressable memory (CAM); and
   a CAM lookup unit coupled to the CAM and configured to:
      generate a lookup key based on a received frame; and
      provide a lookup value using the CAM based on the lookup key,
         wherein the lookup value includes first endpoint information.

4. The IC device of claim 1, wherein the first processing unit includes a cluster with a plurality of sub-processors, and wherein the second processing unit includes a single processor.

5. The IC device of claim 1, wherein the first processing unit includes a first processor of a cluster, and the second processing unit includes a second processor of the cluster.

6. The IC device of claim 1, further comprising:
   a third processing unit including a bridge management layer, wherein the third processing unit is configured to communicate with the network device using the internal endpoint port.

7. The IC device of claim 1,
   wherein the first plurality of memory channels include a first memory channel for communicating data frames for a highest priority schedule queue for a first ethernet interface of the first endpoint; and
   wherein the memory channel configuration unit is for providing a second memory channel for communicating data frames for a highest priority schedule queue for a second ethernet interface of the second endpoint.

8. The IC device of claim 7,
   wherein the first plurality of memory channels include a third memory channel for communicating data frames for a best effort queue for the first ethernet interface of the first endpoint,
   wherein the third memory channel is also used for communicating layer-2 and above control frames.

9. The IC device of claim 1, wherein the memory channel configuration unit is for:
   providing a bridge management memory channel for communicating point-to-point layer-2 control frames between one of the first and second network ports and one of the first and second endpoints.

10. The IC device of claim 6, wherein the bridge management layer is for providing a link layer discovery protocol (LLDP) management information base (MIB).

11. A method, comprising:
    providing a network device including a first network port connected to a network, a second network port connected to the network, and an internal endpoint port connected to a first endpoint including a first processing unit and a second endpoint including a second processing unit;
    receiving a first frame from one of the first network port, second network port, and internal endpoint port;
    performing a lookup process to determine a first forwarding decision for forwarding a first frame to the first endpoint;
    providing a first plurality of memory channels for communicating, to the first endpoint, frames for a plurality of priority queues respectively;
    determining a memory channel of the first plurality of memory channels based on the first forwarding decision for forwarding the first frame to the first endpoint; and
    forwarding the first frame to the first endpoint using the determined memory channel.

12. The method of claim 11, wherein the determined memory channel is a direct memory access (DMA) channel provided by a multi-channel DMA controller.

13. The method of claim 11, wherein the lookup process includes:
    generating a lookup key based on the first frame; and
    providing a lookup value using a content addressable memory (CAM) of the network device based on the lookup key, wherein the lookup value includes first endpoint information.

14. The method of claim 11, wherein the first processing unit includes a cluster with a plurality of sub-processors, and wherein the second processing unit includes a single processor.

15. The method of claim 11, wherein the first processing unit includes a first processor of a cluster, and the second processing unit includes a second processor of the cluster.

16. The method of claim 11, further comprising:

communicating, by a bridge management layer, bridge management information with the network device using the internal endpoint port.

17. The method of claim 11, wherein the first plurality of memory channels include a first memory channel for communicating data frames for a highest priority schedule queue for a first ethernet interface of the first endpoint; and providing a second memory channel for communicating data frames for a highest priority schedule queue for a second ethernet interface of the second endpoint.

18. The method of claim 17, further comprising:

wherein the first plurality of memory channels include a third memory channel for communicating data frames for a best effort queue for the first ethernet interface of the first endpoint, wherein the third memory channel is also used for communicating layer-2 and above control frames.

19. The method of claim 11, further comprising:

providing a bridge management memory channel for communicating point-to-point layer-2 control frames between one of the first and second network ports and one of the first and second endpoints.

20. The method of claim 16, further comprising:

providing, by the bridge management layer is configured to provide a link layer discovery protocol (LLDP) management information base (MIB).

* * * * *